US 8,723,867 B2

(12) United States Patent
Saito et al.

(10) Patent No.: US 8,723,867 B2
(45) Date of Patent: May 13, 2014

(54) GAME APPARATUS, STORAGE MEDIUM STORING A GAME PROGRAM, AND GAME CONTROLLING METHOD

(75) Inventors: Shinya Saito, Kyoto (JP); Yasunari Watanabe, Tokyo (JP); Kenichi Yokoo, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 151 days.

(21) Appl. No.: 12/979,485

(22) Filed: Dec. 28, 2010

(65) Prior Publication Data
US 2011/0098111 A1    Apr. 28, 2011

Related U.S. Application Data

(62) Division of application No. 11/515,026, filed on Sep. 5, 2006, now Pat. No. 7,884,822.

(30) Foreign Application Priority Data

Sep. 2, 2005   (JP) ................................. 2005-255757

(51) Int. Cl.
  *G06T 15/00*   (2011.01)
  *G06F 3/048*   (2013.01)
(52) U.S. Cl.
  CPC ..................................... *G06F 3/048* (2013.01)
  USPC ............... 345/427; 345/473; 345/629; 463/4; 463/31; 463/32
(58) Field of Classification Search
  CPC ....................................................... G06F 3/048
  USPC ................. 345/473, 474, 475, 427, 629, 630; 463/4, 31, 32
  See application file for complete search history.

(56) References Cited

U.S. PATENT DOCUMENTS

| | | | |
|---|---|---|---|
| 5,303,388 | A | 4/1994 | Kreitman et al. |
| 6,323,895 | B1 | 11/2001 | Sata |
| 6,354,944 | B1 | 3/2002 | Takahashi et al. |

(Continued)

FOREIGN PATENT DOCUMENTS

| | | |
|---|---|---|
| EP | 0 911 069 | 4/1999 |
| EP | 1 245 255 | 10/2002 |

(Continued)

OTHER PUBLICATIONS

Sep. 18, 2012 Japanese Office Action for JP 2005-255757, 3 pages.

(Continued)

*Primary Examiner* — Phu K Nguyen
(74) *Attorney, Agent, or Firm* — Nixon & Vanderhye P.C.

(57) ABSTRACT

A game apparatus includes a first LCD and a second LCD, and on the first LCD, a two-dimensional game screen including objects positioned in a two-dimensional coordinate is displayed. When a two-dimensional coordinate of a specific object out of the objects positioned in the two-dimensional coordinate satisfies a predetermined condition, a three-dimensional coordinate of each of the objects is calculated on the basis of the two-dimensional coordinate of each of the objects. The object is modeled in the calculated three-dimensional coordinate, moved by a predetermined animation, and then shot by a virtual camera. Accordingly, a game screen of an image (animation) of the three-dimensional virtual space shot by the virtual camera is displayed on the second LCD.

18 Claims, 20 Drawing Sheets

(56) References Cited

U.S. PATENT DOCUMENTS

| | | |
|---|---|---|
| 6,454,653 B1 | 9/2002 | Kawazu |
| 6,583,793 B1 | 6/2003 | Gould et al. |
| 6,724,385 B2 | 4/2004 | Takatsuka et al. |
| 7,019,742 B2 | 3/2006 | Le Ouay |
| 7,118,480 B2 | 10/2006 | Aoki |
| 7,126,607 B2 | 10/2006 | Emerson |
| 7,263,667 B1 | 8/2007 | Hoellerer et al. |
| 7,450,124 B2 | 11/2008 | Burch et al. |
| 7,614,954 B2 * | 11/2009 | Okazaki et al. ............ 463/32 |
| 7,785,199 B2 | 8/2010 | Nishimura et al. |
| 8,094,153 B2 * | 1/2012 | Saito et al. ............ 345/427 |
| 8,419,538 B2 | 4/2013 | Mashimo et al. |
| 2003/0216177 A1 | 11/2003 | Aonuma et al. |
| 2005/0159197 A1 | 7/2005 | Tawara |
| 2005/0164794 A1 | 7/2005 | Tahara |
| 2005/0187015 A1 | 8/2005 | Suzuki et al. |

FOREIGN PATENT DOCUMENTS

| | | |
|---|---|---|
| JP | 06-285259 | 10/1994 |
| JP | 10-28777 | 2/1998 |
| JP | 2000-107445 | 4/2000 |
| JP | 2000-279637 | 10/2000 |
| JP | 2001-246154 | 9/2001 |
| JP | 2001-325612 | 11/2001 |
| JP | 2002-939 | 1/2002 |
| JP | 2002-49938 | 2/2002 |
| JP | 2002-163676 | 6/2002 |
| JP | 2002-331166 | 11/2002 |
| JP | 2003-019352 | 1/2003 |
| JP | 2003-117233 | 4/2003 |
| JP | 2003-144750 | 5/2003 |
| JP | 2004-000368 | 1/2004 |
| JP | 2004-73682 | 3/2004 |
| JP | 2005-198974 | 7/2005 |
| JP | 2005-211242 | 8/2005 |
| JP | 2005-218778 | 8/2005 |
| JP | 2006-340744 | 12/2006 |
| WO | WO 03/027827 | 4/2003 |
| WO | 2004/045734 | 6/2004 |

OTHER PUBLICATIONS

T. Bramwell, Osu Tatakae Ouendan (First Impressions), Eurogamer, Aug. 28, 2005, http://www.eurogamer.net/article.php?article_id=60518>, 6 pages.

"Super Mario 64DS", Nintendo, product instructions, p. 23, 3 pages, 2006.

"Nintendogs" product instructions, Nintendo, pp. 11 and 20, 3 pages, 2003.

"MADDEN Super Bowl 2005" product instructions, Nintendo, pp. 5-10, 5 pages.

Examination Report in corresponding European Application No. EP 06 120 079.6 dated May 17, 2010.

Jul. 23, 2013 Office Action for JP 2011-224495, 4 pages.

Jul. 23, 2013 Office Action for JP 2011-224495, 2 pages.

Jul. 23, 2013 Office Action for JP 2005-255757, 2 pages.

"Final Fantasy VII", "Continue vol. 9", published by Ohta Publishing Company on Apr. 28, 2003, first copy, pp. 042-043, 5 pages.

Mar. 4, 2014 Decision of Refusal (Office Action) in JP 2005-255757, with English translation, 9 pages.

* cited by examiner

FIG. 3
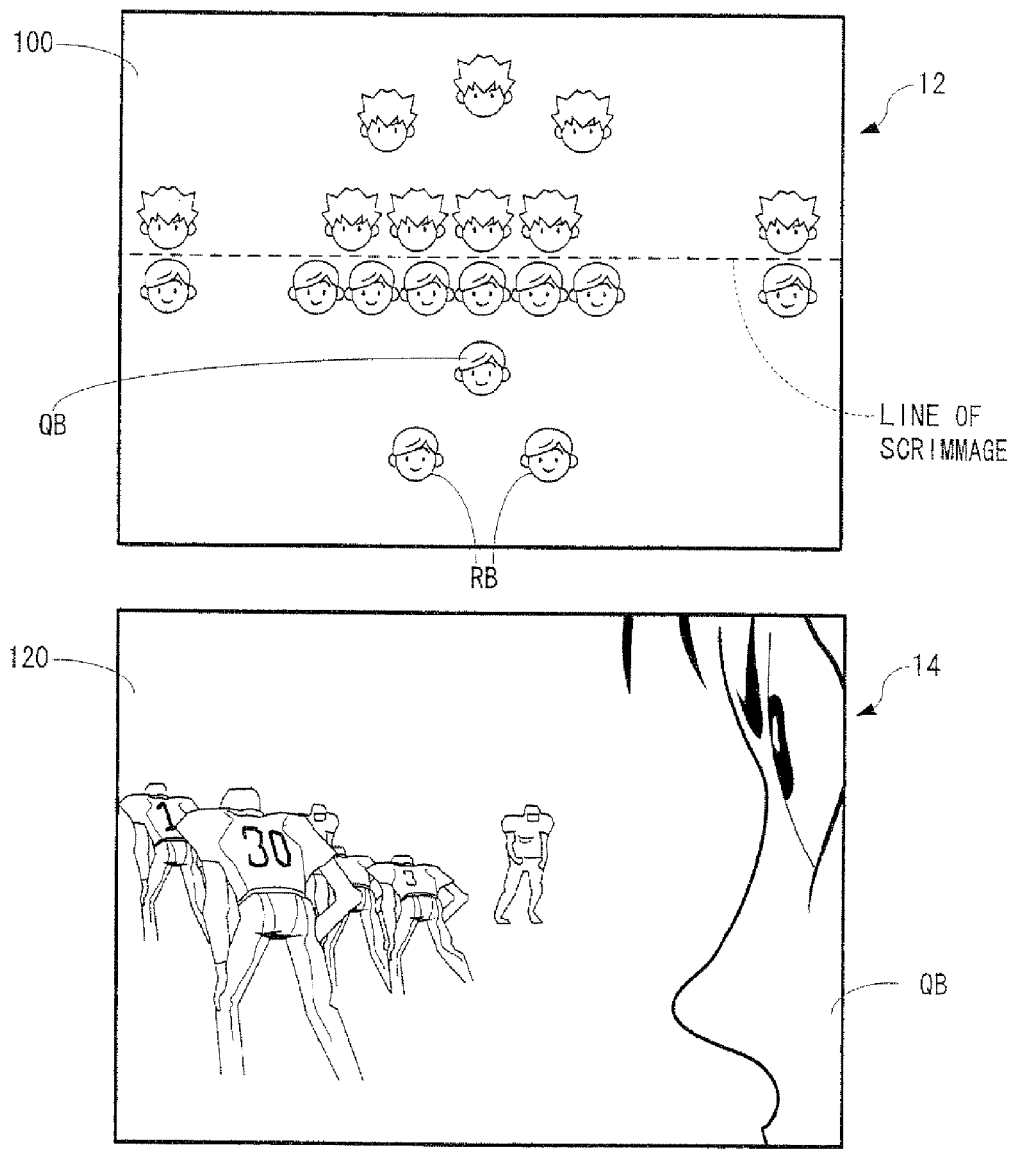
 ... OBJECT OF TEAM OPERATED BY GAME PLAYER
 ... OBJECT OF TEAM OPERATED BY OPPOSITION (INCLUDING COMPUTER)

FIG. 7
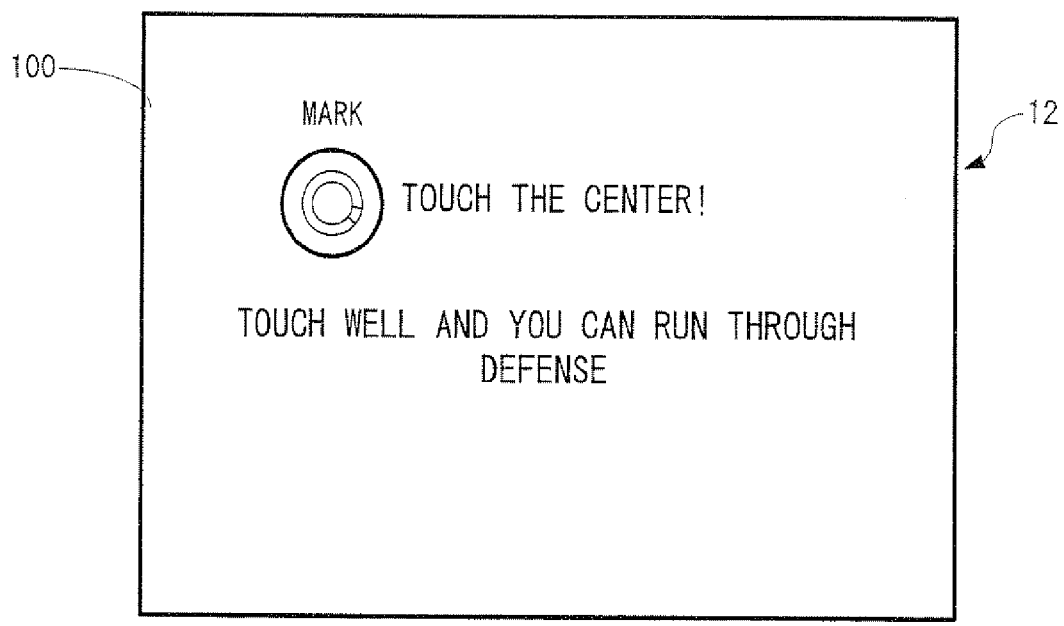
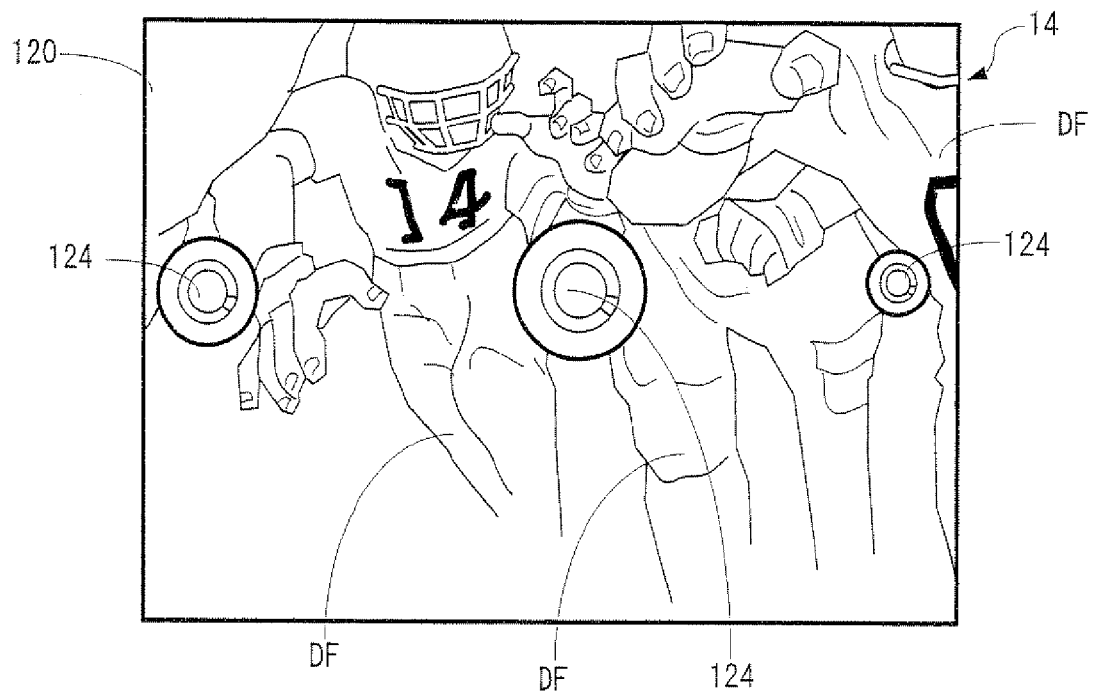

FIG. 11

(A) CAMERA SETTING DATA  482b

| SETTING A DATA (POSITION a1, DIRECTION a2) |
| SETTING B DATA (POSITION b1, DIRECTION b2) |
| SETTING C DATA (POSITION b1, DIRECTION b2) |
| ⋮ |

(B) ANIMATION DATA  482c

RUNNING

| A DATA (PLAYER RUNS WITH BALL IN ONE HAND) |
| B DATA (PLAYER RUNS WITH BALL IN BOTH HANDS) |
| C DATA (SLOW PLAYER RUNS) |
| ⋮ |

KNOCKED DOWN

| A DATA (PLAYER IS KNOCKED DOWN BY TACKLE 1) |
| B DATA (PLAYER IS KNOCKED DOWN BY TACKLE 2) |
| C DATA (PLAYER IS GRABBED AND AND KNOCKED DOWN) |
| ⋮ |

⋮

(C) MODELING DATA  482d

| PLAYER A DATA (TALL AND SMART) |
| PLAYER B DATA (TALL AND MEDIUM SHAPE) |
| PLAYER C DATA (MEDIUM HEIGHT AND SHAPE) |
| ⋮ |

FIG. 12

(A) FORMATION DATA    482e

| TEAM A DATA |
| TEAM B DATA |
| TEAM C DATA |
| TEAM D DATA |
| ⋮ |

(B) ROUTE DATA    482f

| FORMATION A DATA |
| FORMATION B DATA |
| FORMATION C DATA |
| ⋮ |

(C) TABLE DATA    482g

| OFFENCE / DEFFENCE | RIGHT | MIDDLE | LEFT |
|---|---|---|---|
| RIGHT | FIRST TIME<br>(1) THREE | SECOND TIME<br>(1) TWO<br>(2) THREE | THIRD TIME<br>(1) ONE<br>(2) TWO<br>(3) THREE |
| MIDDLE | SECOND TIME<br>(1) TWO<br>(2) THREE | FIRST TIME<br>(1) THREE | SECOND TIME<br>(1) TWO<br>(2) THREE |
| LEFT | THIRD TIME<br>(1) ONE<br>(2) TWO<br>(3) THREE | SECOND TIME<br>(1) TWO<br>(2) THREE | FIRST TIME<br>(1) THREE |

FIG. 13

(A) ENCOUNTER ARRANGEMENT DATA    482i

| ARRANGEMENT A DATA | THE NUMBER OF ENCOUNTERS:1 |
| --- | --- |
| ARRANGEMENT B DATA | THE NUMBER OF ENCOUNTERS:2 |
| ARRANGEMENT C DATA | THE NUMBER OF ENCOUNTERS:2 |
| ARRANGEMENT D DATA | THE NUMBER OF ENCOUNTERS:3 |
| ARRANGEMENT E DATA | THE NUMBER OF ENCOUNTERS:3 |
| ARRANGEMENT F DATA | THE NUMBER OF ENCOUNTERS:3 |
| ⋮ | |

(B) MARK IMAGE DISPLACEMENT DATA    482j

| |
| --- |
| DISPLACEMENT DATA A:<br>FRAME 1, FRAME 2, FRAME 3, ⋯ |
| DISPLACEMENT DATA B:<br>FRAME 1, FRAME 2, FRAME 3, ⋯ |
| DISPLACEMENT DATA C:<br>FRAME 1, FRAME 2, FRAME 3, ⋯ |
| DISPLACEMENT DATA D:<br>FRAME 1, FRAME 2, FRAME 3, ⋯ |
| DISPLACEMENT DATA E:<br>FRAME 1, FRAME 2, FRAME 3, ⋯ |
| DISPLACEMENT DATA F:<br>FRAME 1, FRAME 2, FRAME 3, ⋯ |
| DISPLACEMENT DATA G:<br>FRAME 1, FRAME 2, FRAME 3, ⋯ |
| ⋮ |

※FRAME=VALUE OF AFTER-ENCOUNTERING-ELAPSED-TIME COUNTER

GAME APPARATUS, STORAGE MEDIUM STORING A GAME PROGRAM, AND GAME CONTROLLING METHOD

REFERENCE TO RELATED APPLICATIONS

This application is a divisional of Ser. No. 11/515,026 filed Sep. 5, 2006 now U.S. Pat. No. 7,884,822, which claims priority under 35 U.S.C. §119(a) to Patent Application No. 2005-255757 filed in Japan on Sep. 2, 2005, the entire contents of which are hereby incorporated by reference.

BACKGROUND

1. Field

Example embodiments of the present invention relate to a game apparatus, a storage medium storing a game program, and a game controlling method. More specifically, example embodiments of the present invention relate to a game apparatus, a storage medium storing a game program, and a game controlling method which properly set a virtual camera according to a game situation and display a suitable game image according to the game situation (1). Also, example embodiments of the present invention relate to a game apparatus, a storage medium storing a game program, and a game controlling method which accept an input from a player in accordance with a game situation, and advance the game (2). Furthermore, example embodiments of the present invention relate to a game apparatus, a storage medium storing a game program, and a game controlling method which cause a player to make a coordinate input to a game image (3).

2. Description of the Related Art

One example of such a kind of related art is disclosed in the Document 1 ("Super Mario 64DS" product instructions P23). According to the Document 1, an image showing a narrow range and an image panoramically showing a wide range in a game world are displayed. Additionally, the image showing a narrow range is obtained by making a virtual camera (perspective) follow a player object. Accordingly, with reference to the image with a wide range, for example, such as an entire map, a player contrives a strategy (route) for moving a player object to a destination, and with reference to the image with a narrow range, the player moves the player object by making it defeat an enemy object, avoid an obstruction.

Furthermore, another example of the related art is disclosed in the Document 2 ("MADDEN Super Bowl 2005" product instructions P5-P10). According to the Document 2, with one button operation and a combination of button operations, detailed actions of an offense and a defense in the American football game can be instructed. Therefore, a player can enjoy playing the game with reality.

In addition, the other example of the related art is disclosed in the Document 3 ("Nintendogs" product instructions P11, P20). According to the Document 3, a player can call a dog, pat the dog displayed on the screen and wash the dog with shampoo under certain circumstancies by touching and stroking a touch screen.

However, in the technique of the Document 1, the image with a wide range and the image with a narrow range are displayed, but if the image with a narrow range is displayed, the perspective (virtual camera) merely follows the player object, and therefore, it is impossible to display an appropriate place in detail according to the circumstances.

Also, in the technique of the Document 2, the operation is complicated, and therefore, it is difficult to perform a proper operation at proper timing. Also, a beginner of the game and one who is ignorant of American football itself might lose an interest to the game.

In addition, in the technique of the Document 3, a touch operation to the object image itself can easily be performed, but if a touch operation to the one except for the object image is performed, no mark, etc. is displayed, and therefore, it is difficult for the player to know a position or range (area) on which a coordinate instruction can be performed.

SUMMARY

Therefore, example embodiments of the present invention provide a novel game apparatus, storage medium storing a game program, and game controlling method.

Other example embodiments of the present invention provide a game apparatus, a storage medium storing a game program, and a game controlling method which can display an appropriate screen in accordance with a game situation.

Other example embodiments of the present invention provide a game apparatus, a storage medium storing a game program, and a game controlling method which can easily enjoy a game play.

Other example embodiments of the present invention provide a game apparatus, a storage medium storing a game program, and a game controlling method which can properly set a region for a coordinate instruction according to a game situation.

Example embodiments of the present invention adopt the following construction in order to solve the above-described problems. It should be noted that reference numerals and footnote, etc. which are enclosed in parentheses show only one example of correspondences with the embodiment described later in order to help the understandings of example embodiments of the present invention, and do not limit the present invention.

A first game apparatus according to an example embodiment of the present invention comprises an object arranging means, a first game image display controlling means, a determining means, and a second game image display controlling means. The object arranging means arranges a first object and a second object in a first virtual game world, and performs a movement control on at least one of the first object and the second object. The first game image display controlling means generates a game image panoramically or planarly representing the first virtual game world on the basis of an arrangement state by the object arranging means, and displays it on a first display portion. The determining means determines whether or not a positional relationship between the first object and the second object satisfies a predetermined condition in the first virtual game world. The second game image display controlling means, when the determination result by the determining means is affirmative, sets a virtual camera in a three-dimensional second virtual game world on the basis of at least one of a first object position and a second object position in the first virtual game world, arranges at least one of the first object and the second object in the second virtual game world, generates a game image by shooting the second virtual game world with the virtual camera in such a manner as to include at least one of the first object and the second object which are arranged, and displays it on a second display portion.

More specifically, a game apparatus (10) comprises an object arranging means (42, S17, S25, S37, S41, S43, S71, S73, S81, S83, S95), a first game image display controlling means (42, S19, S27, S45, S75, S97), a determining means (42, S39), and a second game image display controlling means (42, S49, S55, S57). The object arranging means (42, S17, S25, S37, S41, S43, S71, S73, S81, S83, S95) arranges a first object (RB) and a second object (DF) in a first virtual game world, and performs a movement control on at least one of the first object (RB) and the second object (DF). The first game image display controlling means (42, S19, S27, S45, S75, S97) generates a game image (100) panoramically or planarly representing the first virtual game world on the basis of an arrangement state by the object arranging means (42, S17, S25, S37, S41, S43, S71, S73, S81, S83, S95), and displays it on a first display portion (12). The determining means (42, S39) determines whether or not a positional relationship between the first object (RB) and the second object (DF) satisfies a predetermined condition in the first virtual game world. The second game image display controlling means (42, S49, S55, S57), when the determination result by the determining means (42, S39) is affirmative, sets a virtual camera in a three-dimensional second virtual game world on the basis of at least one of a position of the first object (RB) and a position of the second object (DF) in the first virtual game world, arranges at least one of the first object (RB) and the second object (RB) in the second virtual game world, generates a game image (120) by shooting the second virtual game world with the virtual camera in such a manner as to include at least one of the first object (RB) and the second object (DF) which are arranged, and displays it on a second display portion (14).

It should be noted that the game apparatus (10) is provided with the first display portion (12) and second display portion (14), but it needs not be provided with these two displays. For example, one display may be divided into two display areas. Or, a game image (100) and a game image (120) may be switched and displayed on a single display. The same is true for the following.

According to an example embodiment of the present invention, when the positional relationship between the first object and the second object in the first game world satisfies a predetermined relationship, a virtual camera is set in three-dimensional second virtual game world, and an image shot by the virtual camera is displayed as a game image. Thus, it is possible to appropriately display a game screen according to the game situations.

In one aspect of an example embodiment of the present invention, the game apparatus further comprises a camera setting means for determining at least one of a position and a direction of the virtual camera on the basis of the first object position and the second object position in the first virtual game world when the determination result by the determining means is affirmative, a first object position determining means for determining the first object position in the second virtual game world on the basis of the first object position in the first virtual game world, and a second object position determining means for determining the second object position in the second virtual game world on the basis of the second object position in the first virtual game world. The camera setting means determines at least one of a position and a direction of the virtual camera in such a manner as to shoot both of the first object and the second object. More specifically, when the determination result by the determining means (42, S39) is affirmative ("YES" in S39), a camera setting means (42, S55) determines at least one of a position and a direction of the virtual camera on the basis of the position of the first object (RB) and the position of the second object (DF) in the first virtual game world. A first object position determining means (42, S49) determines the position of the first object (RB) in the second virtual game world on the basis of the position of the first object (RB) in the first virtual game world. Also, a second object position determining means (42, S49) determines the position of the second object (DF) in the second virtual game world on the basis of the position of the second object (DF) in the first virtual game world. The camera setting means (42, S55) sets at least one of a position and a direction of the virtual camera in such a manner as to shoot both of the first object (RB) and the second object (DF). For example, if the first object (RB) and the second object (DF) exist face to face with each other, it is possible to set the virtual camera in a position parallel with the horizontal direction including the midpoint and views the first object (RB) and the second object (DF) from an oblique side. That is, the object position in the second game world is determined on the basis of the object position in the first game world, and the virtual camera is set in such a manner as to shoot the object in the second game world, and therefore, the object in the three-dimensional second game world can be viewed in the positional relationship of the objects in the first game world.

In another aspect of an example embodiment of the present invention, the game apparatus further comprises a camera position determining means for determining a position of virtual camera on the basis of the first object position in the first virtual game world when the determination result by the determining means is affirmative, a first object position determining means for determining the first object position in the second virtual game world on the basis of the first object position in the first virtual game world, a second object position determining means for determining the second object position in the second virtual game world on the basis of the second object position in the first virtual game world, and a camera direction determining means for determining a direction of the virtual camera in such a manner as to shoot both of the first object and the second object. More specifically, unlikely to an example embodiment of the above-described invention, the position of the virtual camera is determined on the basis of the position of the first object (RB) in the first virtual game world, and the direction is determined in such a manner as to shoot the first object (RB) and the second object (DF) by taking the first object (RB) as a center. Thus, the object in the three-dimensional second game world can also be viewed according to the positional relationship in the first game world.

In another aspect of an example embodiment of the present invention, the game apparatus further comprises a camera position determining means for determining a position of the virtual camera on the basis of the first object position in the first virtual game world when the determination result by the determining means is affirmative, a second object position determining means for determining a direction of the second object in the second virtual game world on the basis of the second object position in the first virtual game world, and a camera direction determining means for determining the virtual camera direction in such a manner as to shoot the second object. More specifically, unlikely to an example embodiment of the above-described invention, the position of the virtual camera is determined on the basis of the position of the first object (RB) in the first virtual game world, and determines the direction in such a manner as to shoot the second object (DF) by taking the first object (RB) as a center. Thus, similarly to the above-described example embodiment of invention, the object in the three-dimensional second game world can be viewed in the positional relationship in the first game world.

In one embodiment of the present invention, the second game image display controlling means sets the virtual camera in the second virtual game world on the basis of at least the first object position in the first virtual game world, arranges at least the second object in the second virtual game world, generates the game image by shooting the second virtual game world with the virtual camera in such a manner as to include at least the second object, and displays it on the second display portion. More specifically, the second game image display controlling means (42, S49, S55, S57) sets the virtual camera in the second virtual game world on the basis of at least the position of the first object (RB) in the first virtual game world. In addition the second game image display controlling means (42, S49, S55, S57) arranges at least the second object (DF) in the second virtual game world, generates the game image (120) by shooting the second virtual game world with the virtual camera in such a manner as to include at least the second object (DF), and displays it on the second display (14). Accordingly, the image obtained by viewing the second object (DF) from the first object (RB) is displayed as the game image (120). Accordingly, it is possible to properly display the game screen according to the game situations.

In another embodiment of this invention, the second game image display controlling means includes a camera direction determining means for determining a direction of the virtual camera on the basis of at least the second object position in the second virtual game world. More specifically, the camera direction determining means (42, S55) determines the direction of the virtual camera on the basis of the position of at least the second object (DF) in the second virtual game world. For example, it is possible to generate the game image of the first object (RB) which is viewed from the second object (DF). That is, it is possible to properly display the game screen according to the game situations.

In the other aspect of an example embodiment of the present invention, the second game image display controlling means includes a camera direction determining means for determining a direction of the virtual camera on the basis of a direction or a moving direction of at least the first object in the first virtual game world. More specifically, the camera direction determining means (42, S55) determines the direction of the virtual camera on the basis of a direction or a moving direction of at least the first object (RB) in the first virtual game world. Accordingly, the image viewed along the line of sight and in the direction of travel of the first object (RB) can be displayed as a game image (120). That is, it is possible to properly display the game screen according to the game situations.

In another example embodiment of the present invention, the determining means determines whether or not a positional relationship between the first object and the second object in the first virtual game world is below a predetermined distance. More specifically, the determining means (42, S39) determines whether or not a positional relationship between the first object (RB) and the second object (DF) in the first virtual game world is below a predetermined distance. That is, it is determined that one object is closer to another object above a predetermined distance. Thus, the distance is merely detected between the objects, and therefore, it is possible to easily make the determination.

In another aspect of an example embodiment of the present invention, the game apparatus further comprises an input accepting means for accepting an operation input from a player when the determination result by the determining means is affirmative, and an object action state determining means for determining an action or a state of at least one of the first object and the second object in the first virtual game world in response to the operation input accepted by the input accepting means. More specifically, the input accepting means (22, 42, S61) accepts an operation input from a player when the determination result by the determining means (42, S39) is affirmative ("YES" in S39). The object action state determining means (42, S69, S79, S81, S83) determines an action or a state of at least one of the first object (RB) and the second object (DF) in the first virtual game world in response to the operation input accepted by the input accepting means (22, 42, S61). For example, a player makes the object move, act, and changes the state of the object. That is, an operation input is accepted as necessary, and therefore, the player need not constantly perform a game operation, and can advance the game with a relatively easy operation.

In the other aspect of an example embodiment of this invention, the game apparatus further comprises a coordinate input means for inputting a coordinate to a second display to display the game image generated by the second game image display controlling means, and the input accepting means accepts the operation input from a player by the coordinate input means when the determination result by the determining means is affirmative. More specifically, a coordinate input means (22, 42) is provided on the second display portion (14) to display a game image (120). The input accepting means (22, 42, S61) accepts an operation input from the player by the coordinate input means (22, 42) when the determination result by the determining means (42, S39) is affirmative ("YES" in S39), that is, at a predetermined timing. As the coordinate input means (22, 42), for example, pointing devices, such as a touch panel, a computer mouse, a touch pen, a tablet, etc. can be utilized. That is, the coordinate input is merely performed at a predetermined timing, capable of enhancing the operability.

In one embodiment of the present invention, the game apparatus further comprises a input region setting means for setting an input region to the second display portion which displays the game image generated by the second game image display controlling means on the basis of at least one of the first object position and the second object position in the first virtual game world, and the object action state determining means determines an action or a state of at least one of the first object and the second object in the first virtual game world according to the comparison result between the coordinate by the operation input from the player accepted by the input accepting means and the input region set by the input region setting means. More specifically, the input region setting means (42, S201, S203) sets an input region to the second display portion (14) which displays the game image (120) generated by the second game image display controlling means (42, S49, S55, S57) on the basis of at least one of the position of the first object (RB) and the position of the second object (DF) in the first virtual game world. The object action state determining means (42, S69, S79, S81, S83) determines an action or a state of at least one of the first object (RB) and the second object (DF) in the first virtual game world according to the comparison result between the coordinate (instructed coordinate) by the operation input from the player and the input region. Thus, by merely performing a coordinate input, the action and the state of the object can be changed, and therefore, a complicated process is executed with a simple operation, capable of increasing an interest of the game.

A second game apparatus according to an example embodiment of the present invention comprises an object arranging means, a first game image display controlling means, a determining means, and a second game image display controlling means. The object arranging means arranges a first object and a second object in a two-dimensional virtual game world, and performs a movement control on at least one of the first object and the second object. The first game image display controlling means generates a game image representing the two-dimensional virtual game world on the basis of an arrangement state by the object arranging means, and displaying it on a first display portion. The determining means determines whether or not a positional relationship between the first object and the second object satisfies a predetermined condition in the two-dimensional virtual game world. The second game image display controlling means, when the determination result by the determining means is affirmative, sets a virtual camera in a three-dimensional virtual game world on the basis of at least one of a first object position and a second object position in the second virtual game world, arranges at least one of the first object and the second object in the three-dimensional virtual game world, generates a game image by shooting the three-dimensional virtual game world with the virtual camera in such a manner as to include at least one of the first object and the second object which are arranged, and displays it on a second display portion.

More specifically, the example embodiment of the invention is the same as an example embodiment of invention of the first game apparatus except for that the first virtual game world shall be the two-dimensional virtual game world, and the second virtual game world shall be the three-dimensional virtual game world. That is, a three-dimensional game image (120) is generated and displayed depending on the positional relationship between the first object (RB) and the second object (DF) in the two-dimensional space.

In an example embodiment of this invention also, similarly to an example embodiment of the invention of the first game apparatus, it is possible to appropriately display the game screen according to the game situations.

A third game apparatus according to an example embodiment of the present invention comprises an object arranging means, a first game image display controlling means, a determining means, and a second game image display controlling means. The object arranging means arranges a first object and a second object in a three-dimensional virtual game world, and performs a movement control on at least one of the first object and the second object. The first game image display controlling means generates a game image shot by a virtual camera which is directed to a fixed direction on the basis of the arrangement state by the object arranging means and shoots the three-dimensional virtual game world including at least one of the first object and the second object, and displays it on a first display portion. The determining means determines whether or not a positional relationship between the first object and the second object satisfies a predetermined condition in the three-dimensional virtual game world. The second game image display controlling means, when the determination result by the determining means is affirmative, sets a virtual camera on the basis of at least one of the first object position and the second object position in the three-dimensional virtual game world, generates a game image by shooting the three-dimensional virtual game world with the virtual camera, and displays it on a second display portion.

More specifically, an example embodiment of the present invention is approximately the same as an example embodiment of the invention of the first game apparatus except for that the first virtual game world shall be the three-dimensional virtual game world. That is, depending on the positional relationship between the first object (RB) and the second object (DF) in the three-dimensional space, the three-dimensional game image (120) different from the game image (100) is generated and displayed.

In an example embodiment of this invention also, similarly to an example embodiment of the invention of the first game apparatus, it is possible to appropriately display the game screen according to the game situations.

A fourth game apparatus according to an example embodiment of the present invention comprises an object arranging means, a first game image displaying means, a determining means, and a second game image display controlling means. The object arranging means arranges a first object and a second object in a three-dimensional virtual game world, and performs a movement control on at least one of the first object and the second object. The first game image display controlling means generates a game image obtained by panoramically or planarly shooting the three-dimensional virtual game world with the first virtual camera on the basis of an arrangement state by the object arranging means and displays it on a first display portion. The determining means determines whether or not a positional relationship between the first object and the second object satisfies a predetermined condition in the three-dimensional virtual game world. The second game image display controlling means, when the determination result by the determining means is affirmative, sets a second virtual camera on the basis of the first object position and the second object position in the three-dimensional virtual game world, generates a game image by shooting the three-dimensional virtual game world with the second virtual camera, and displays it on a second display portion.

Additionally, the first virtual camera and the second virtual camera may be the same. In such a case, the first display portion and the second display portion are the same, and display the game images by switching them.

In an example embodiment of this invention also, similarly to an example embodiment of the invention of the third game apparatus, it is possible to appropriately display the game screen according to the game situations.

A fifth game apparatus according to an example embodiment of the present invention comprises a determining means for determining whether or not a positional relationship between a first object and a second object in a two-dimensional coordinate system satisfies a predetermined condition, and a camera setting means for setting a virtual camera to be arranged in a three-dimensional virtual game world on the basis of the first object position and the second object position when the determination result by the determining means is affirmative.

More specifically, the game apparatus (10) comprises a determining means (42, S39) and a camera setting means (42, S55). The determining means (42, S39) determines whether or not a positional relationship between a first object (RB) and a second object (DF) in a two-dimensional coordinate system satisfies a predetermined condition. The camera setting means (42, S55) sets a virtual camera to be arranged in a three-dimensional virtual game world on the basis of the position of the first object (RB) and the position of the second object (DF) when the determination result by the determining means (42, S39) is affirmative ("YES" in S39). For example, at least one of the position and the direction of the virtual camera is set.

According to an example embodiment of the present invention, similarly to an example embodiment of the invention of the first game apparatus, it is possible to appropriately display the game screen according to the game situations.

In one aspect of an example embodiment of the present invention, the game apparatus further comprises an image displaying means for displaying a shooting result by the virtual camera as a game screen, a pointing device provided in association with the image displaying means, and an object action state determining means for determining an action or state of at least one of the first object and the second object in response to an input to the game screen displayed by the image displaying means with the pointing device. More specifically, an image displaying means (14) displays a shooting result by the virtual camera as a game screen. Also, the pointing device (22) is provided in association with the image displaying means (14). The object action state determining means (42, S69, S79, S81, S83) determines an action or state of at least one of the first object (RB) and the second object (DF) in response to an input to the game screen with the pointing device (22). That is, according to an operation by a player, the action and state of the object can be changed, and this allows the player to perform an intuitive operation of the object.

A sixth game apparatus according to an example embodiment of the present invention comprises an operation input detecting means for detecting an operation input by a player, a first object controlling means for changing first action relation data relating to a first object, a first determining means for determining whether or not the operation input acceptable condition is satisfied in relation to the first action relation data, and a game situation changing means for changing game situation data indicative of a game situation on the basis of the operation input detected by the operation input detecting means when it is determined that the input acceptable condition is satisfied by the first determining means.

More specifically, an operation input detecting means (42, S23, S61) detects an operation input by a player. A first object controlling means (42, S25, S27, S29) changes first action relation data (data indicative of a position and an action of the object) relating to the first object (RB). A first determining means (42, S39) determines whether or not the operation input acceptable condition is satisfied in relation to the first action relation data. A game situation changing means (42, S69, S79, S81, S83) changes game situation data indicative of a game situation on the basis of the operation input detected by the operation input detecting means (42, S23, S61) when it is determined that the input acceptable condition is satisfied by the first determining means (42, S39) ("YES" in S39).

According to an example embodiment of the present invention, a game situation can be changed on the basis of an operation input at an operation input acceptable timing, and therefore, the player can participate in a game play at an appropriate timing.

In one embodiment of an example embodiment of the present invention, the first object controlling means automatically changes the first action relation data at least when it is determined that the operation input acceptable condition is not satisfied by the determining means. More specifically, a first object controlling means (42, S25, S27, S29) automatically changes the first action relation data at least when it is determined that the operation input acceptable condition is not satisfied by the determining means (42, S39). That is, even when the player does not make an operation like in an input unacceptable state, the position, etc. of the object can be changed.

In another embodiment of an example embodiment of the present invention, the first object controlling means automatically changes the first action relation data when it is determined that the operation input acceptable condition is satisfied by the first determining means, and further comprises a second determining means for determining whether or not the operation input unacceptable condition is satisfied in relation to the first action relation data, and the game situation changing means changes game situation data indicative of the game situation on the basis of the operation input detected by the operation input detecting means from a time when it is determined that the input acceptable condition is satisfied by the first determining means to a time when it is determined that the input unacceptable condition is satisfied by the second determining means. More specifically, a first object controlling means (42, S25, S27, S29) automatically changes the first action relation data when it is determined that the operation input acceptable condition is satisfied by the first determining means (42, S39) ("YES" in S39). A second determining means (42, S65, S67) determines whether or not the operation input unacceptable condition is satisfied in relation to the first action relation data. A game situation changing means (42, S69, S79, S81, S83) changes a game situation from a time when it is determined that the input acceptable condition is satisfied to a time when it is determined that the input unacceptable condition is satisfied. That is, it is possible to make an operation input only during the time determined by the positional relationship between the objects.

In another embodiment of the present invention, the game situation data includes first action relation data. More specifically, the game situation data includes first action relation data. Accordingly, a position and an action of the first object (RB) can be changed on the basis of the operation input by the player. Thus, a suitable operation at a right timing is required, enhancing an interest of the game.

In the other embodiment of the present invention, the first action relation data includes the first object position data in the virtual game world. More specifically, the first action data includes the position data of the first object (RB) in the virtual space. Accordingly, depending on the operation timing and the operation accuracy, the moving distance of the first object (RB) can be extended, or the first object (RB) can be move away from the enemy object.

In another embodiment of the present invention, the first determining means determines whether or not the input acceptable condition is satisfied on the basis of the first action relation data and second action relation data of a second object different from the first object. More specifically, the first determining means (42, S39) determines whether or not the input acceptable condition is satisfied on the basis of the first action relation data and second action relation data of a second object (DF) different from the first object (RB). For example, in a case that the position indicative of the first action relation data and the position indicative of the second action data satisfy a predetermined relationship, it is determined that the input acceptable condition is satisfied. Thus, the player can operate the object at a right timing.

In a further embodiment of the present invention, the game situation data includes the second action relation data. More specifically, the game situation data includes the second action relation data. That is, according to the player's operation, a positional relationship with the second object (DF) and the action of the second object (DF) can be changed. That is, according to the player's operation, the position and action of another object as well as those of the object operated by the player can be changed, and therefore, it is possible to enjoy a complicated game progress with a simple operation.

In one aspect of an example embodiment of the present invention, the game apparatus comprises a game image displaying means for displaying a game image including the second object, and the operation input detecting means detects an operation input for coordinate instruction to the game image. More specifically, a game image displaying means (14, 42, S57, S59) displays a game image (120) including the second object (DF). The operation input detecting means (42, S23, S61) detects an operation input for coordinate instruction to the game image (120). Thus, the operation input is a simple operation, such as a coordinate instruction, and therefore, it is possible to enjoy playing the game with a simple operation.

In one embodiment of the present invention, the game image displaying means displays a mark image so as to be combined with the game image, the operation input detecting means detects an operation input for coordinate instruction to the mark image, and the game situation data changing means changes the game situation data depending on success or failure of the operation input for coordinate instruction to the mark image. More specifically, the game image displaying means (14, 42, S57, S59) displays a mark image (124) so as to be combined with the game image. The operation input detecting means (42, S23, S61) detects an operation input for coordinate instruction to the mark image (124). That is, the player instructs the coordinate by taking the mark image (124) as a target. The game situation data changing means (42, S69, S79, S81, S83) changes the game situation data depending on right and wrong of the operation input for coordinate instruction to the mark image (124). For example, when the center of the mark image (124) is instructed, a high score is added, or the object is moved to an advantageous position for the player. Furthermore, when a position of the mark image (124) away from the center thereof is instructed, or when the mark image (124) is not instructed, the score is subtracted or takes a disadvantageous action for the player. Thus, a mark, such as mark image is displayed to allow the player an easy operation. Additionally, depending on whether right and wrong of the coordinate instruction, a game condition can be changed, and therefore, the player can enjoy playing the game with a simple operation.

In another embodiment of the present invention, the game situation changing means executes a mini game on the basis of the operation input detected by the operation input detecting means, and changes game situation data according to the result of the mini game. More specifically, the game situation changing means (42, S69, S79, S81, S83) executes a mini game on the basis of the operation input detected by the operation input detecting means (42, S23, S61), and changes game situation data according to the result of the mini game. That is, a game result of the mini game can be reflected on the game situation in addition to drafting a strategy, capable of preventing the game from being monotonous.

The other embodiment of the present invention further comprises a second object controlling means for changing the first action relation data when the mini game is executed, and a second determining means for determining whether or not the first action relation data satisfies the end condition of the mini game when the mini game is executed by the mini game executing means, and the first determining means determines that the operation input acceptable condition is not satisfied when the end condition of the mini game is satisfied by the second determining means. More specifically, a second object controlling means (42, S71, S73, S75, S79, S81, S83) changes the first action relation data when the mini game is executed. A second determining means (42, S65, S67) determines whether or not the first action relation data satisfies the end condition of the mini game when the mini game is executed. A first determining means (42, S39) determines that the operation input acceptable condition is not satisfied when the end condition of the mini game is satisfied by the second determining means (42, S65, S67). That is, the detection of the operation input for coordinate instruction is ended. Thus, the position and action of the object are changed even during execution of a mini game, and the operation input for coordinate instruction can be made until the end of the mini game.

In a further embodiment of the present invention, the operation input detecting means detects the operation input only from a time when it is determined that the operation input acceptable condition is satisfied by the first determining means to a time when it is determined that a predetermined condition is satisfied. More specifically, the operation input detecting means (42, S23, S61) detects the operation input only from a time when it is determined that the operation input acceptable condition is satisfied by the first determining means (42, S39) ("YES" in S39) to a time when it is determined that a predetermined condition is satisfied ("YES" in S65, "YES" in S67). Thus, it is possible to make an operation input only during the time determined by the positional relationship between the objects.

A seventh game apparatus according to an example embodiment of the present invention comprises a first game image displaying means for displaying a first game image as to a first range in a virtual game world, a second game image displaying means for displaying a second game image as to a second range narrower than the first range in the virtual game world, a determining means for determining whether or not a positional relationship between a first object and a second object displayed on the first game image satisfies a predetermined condition, and a camera setting means for setting a position and a direction of a virtual camera to display the second game image on the basis of the first object position and the second object position which are displayed on the first game image when the determination result by the determining means is affirmative.

More specifically, a first game image displaying means (12) displays a first game image (100) as to a first range in a virtual game world. A second game image displaying means (14) displays a second game image (120) as to a second range narrower than the first range in the virtual game world. A determining means (42, S39) determines whether or not a positional relationship between a first object (RB) and a second object (DF) displayed on the first game image (100) satisfies a predetermined condition. Except for the above description, the an example embodiment of the invention is the same as an example embodiment of the invention of the first game apparatus, and therefore, a duplicated description is omitted.

In an example embodiment of this invention also, similarly to an example embodiment of the invention of the first game apparatus, it is possible to appropriately display the game screen according to the game situations.

A eighth game apparatus according to an example embodiment of the present invention comprises a game image generating means for generating a game image including at least an object image on the basis of a three-dimensional coordinate of the object in the virtual game world, a mark coordinate calculating means for calculating a two-dimensional coordinate to combine a mark image with the game image on the basis of the three-dimensional coordinate of the object, a combining means for combining the mark image with the game image generated by the game image generating means in the two-dimensional coordinate calculated by the mark coordinate calculating means, an operation input detecting means for detecting an operation input from a player, and a game processing means for performing different game processes depending on whether or not the position indicated by the operation input detected by at least the operation input detecting means is on the mark image.

More specifically, the game apparatus (10) comprises a game image generating means (42, S57), a mark coordinate calculating means (42, S201, S203, S205), a combining means (42, S213), an operation input detecting means (42, S23, S61), and a game processing means (42, S63-S87). The game image generating means (42, S57) generates a game image including at least an object image on the basis of a three-dimensional coordinate of the object (DF) in the virtual game world. The mark coordinate calculating means (42, S201, S203, S205) calculates a two-dimensional coordinate to combine a mark image (124) with the game image on the basis of the three-dimensional coordinate of the object. The combining means (42, S213) combines the mark image (124) with the game image generated by the game image generating means (42, S57) in the two-dimensional coordinate calculated by the mark coordinate calculating means (42, S201, S203, S205). The operation input detecting means (42, S23, S61) detects an operation input from a player. The game processing means (42, S63-S87) performs different game processes depending on whether or not the position indicated by the operation input detected by at least the operation input detecting means (42, S23, S61) is on the mark image (124).

According to an example embodiment of the present invention, a mark, such as mark image is displayed so as to be combined with the game image to allow the player to easily perform an operation input, such as coordinate instruction. Furthermore, the game processing depending on an operation input to the mark image is performed, and therefore, the player can enjoy playing the game with a simple operation.

A ninth game apparatus according to an example embodiment of the present invention comprises a game image generating means, a calculation means, a screen coordinate transforming means, a region setting means, a mark image display controlling means, a coordinate input means, and a game processing means. The game image generating means generates a game image including at least an object image by shooting a virtual game world with a virtual camera, and displays it on a display portion. The calculation means calculates a new three-dimensional coordinate by performing a predetermined arithmetic process on the basis of the three-dimensional coordinate of the object in the virtual game world. The screen coordinate transforming means transforms the new three-dimensional coordinate calculated by the calculation means to a screen coordinate. The region setting means sets a region on the display portion taking the screen coordinate transformed by the screen coordinate transforming means as a reference. The mark image display controlling means combines a mark image corresponding to the region set by the region setting means with the game image, and displays it on the display portion. The coordinate input means makes a player input coordinates on the display. The game processing means performs a predetermined game process by comparing the coordinate input by the coordinate input means and the region set by the region setting means.

More specifically, a game apparatus (10) comprises a game image generating means (42, S57), a calculation means (42), a screen coordinate transforming means (42), a region setting means (42, 5201, S203), a mark image display controlling means (42, S213), a coordinate input means (22, 42, S61), and a game processing means (42, S63-S87). The game image generating means (42, S57) generates a game image (120) including at least an object image (RB, DF) by shooting a virtual game world with a virtual camera, and displays it on a display (14) portion. The calculation means (42) calculates a new three-dimensional coordinate by performing a predetermined arithmetic process on the basis of the three-dimensional coordinate of the object (RB, DF) in the virtual game world. The screen coordinate transforming means (42) transforms the new three-dimensional coordinate calculated by the calculation means (42) to a screen coordinate. The region setting means (42, 5201, S203) sets a region on the display portion (14) taking the screen coordinate transformed by the screen coordinate transforming means (42) as a reference. The mark image display controlling means (42, S213) combines a mark image (124) corresponding to the region set by the region setting means (42, S201, S203) with the game image (120) and displays it on the display portion (14). The coordinate input means (22, 42) makes a player input coordinates on the display portion (14). The game processing means (42, S63-S87) performs a predetermined game process by comparing the coordinate input by the coordinate input means (22, 42, S61) and the region set by the region setting means (42, S201, S203).

According to an example embodiment of the present invention, a mark, such as a mark image is displayed on the set region, and this makes it possible for the player to know the region to be operated.

A tenth game apparatus according to an example embodiment of the present invention comprises a game image generating means, a coordinate determining means, a region setting means, a display controlling means, a coordinate input means, and a game processing means. The game image generating means generates a game image to be displayed on a display portion by shooting a virtual game world with a virtual camera. The coordinate determining means determines a coordinate on the display portion on the basis of three-dimensional coordinates of a plurality of objects in the virtual game world. The region setting means sets a region on the display portion by taking the coordinate determined by the coordinate determining means as a reference. The mark image display controlling means combines a mark image corresponding to the region set by the region setting means with the game image, and displays it on the display portion. The coordinate input means makes a player input coordinates on the display portion. The game processing means performs a predetermined game processing by comparing the coordinate input by the coordinate input means and the region set by the region setting means.

More specifically, an example embodiment of the invention is the same as the ninth game apparatus except for that the region is set on the basis of the three-dimensional coordinates of the plurality of objects by the coordinate determining means (42, S201, S203).

In an example embodiment of this invention also, similarly to an example embodiment of the invention of the ninth game apparatus, the player can easily know the region to be operated.

A first storage medium storing a game program according to an example embodiment of the present invention stores a game program. The game program causes a processor of a game apparatus to function as an object arranging means for arranging a first object and a second object in a first virtual game world, and performing a movement control on at least one of the first object and the second object, a first game image display controlling means for generating a game image panoramically or planarly representing the first virtual game world on the basis of an arrangement state by the object arranging means, and displaying it on a first display portion, a determining means for determining whether or not a positional relationship between the first object and the second object satisfies a predetermined condition in the first virtual game world, and a second game image display controlling means for, when the determination result by the determining means is affirmative, setting a virtual camera in a three-dimensional second virtual game world on the basis of at least one of a first object position and a second object position in the first virtual game world, arranging at least one of the first object and the second object in the second virtual game world, generating a game image by shooting the second virtual game world with the virtual camera in such a manner as to include at least one of the first object and the second object which are arranged, and displaying it on a second display portion.

In an example embodiment of this invention also, similarly to an example embodiment of the invention of the first game apparatus, it is possible to appropriately display the game screen according to the game situations.

A second storage medium storing a game program according to an example embodiment of the present invention stores a game program. The game program causes a processor of the game apparatus to function as an object arranging means for arranging a first object and a second object in a two-dimensional virtual game world, and performing a movement control on at least one of the first object and the second object, a first game image display controlling means for generating a game image representing the two-dimensional virtual game world on the basis of an arrangement state by the object arranging means, and displaying it on a first display portion, a determining means for determining whether or not a positional relationship between the first object and the second object satisfies a predetermined condition in the two-dimensional virtual game world, and a second game image display controlling means for, when the determination result by the determining means is affirmative, setting a virtual camera in a three-dimensional virtual game world on the basis of at least one of a first object position and a second object position in the second virtual game world, arranging at least one of the first object and the second object in the three-dimensional virtual game world, generating a game image by shooting the three-dimensional virtual game world with the virtual camera in such a manner as to include at least one of the first object and the second object which are arranged, and displaying it on a second display portion.

In an example embodiment of this invention also, similarly to an example embodiment of the invention of the second game apparatus, it is possible to appropriately display the game screen according to the game situations.

A third storage medium storing a game program according to an example embodiment of the present invention stored a game program. The game program causes a processor of a game apparatus to function as an object arranging means for arranging a first object and a second object in a three-dimensional virtual game world, and performing a movement control on at least one of the first object and the second object, a first game image display controlling means for generating a game image shot by a virtual camera which is directed to a fixed direction on the basis of the arrangement state by the object arranging means and shoots the three-dimensional virtual game world including at least one of the first object and the second object, and displaying it on a first display portion, a determining means for determining whether or not a positional relationship between the first object and the second object satisfies a predetermined condition in the three-dimensional virtual game world, and a second game image display controlling means for, when the determination result by the determining means is affirmative, setting a virtual camera on the basis of at least one of the first object position and the second object position in the three-dimensional virtual game world, generating a game image by shooting the three-dimensional virtual game world with the virtual camera, and displaying it on a second display portion.

In an example embodiment of this invention also, similarly to an example embodiment of the invention of the third game apparatus, it is possible to appropriately display the game screen according to the game situations.

A fourth storage medium storing a game program according to an example embodiment of the present invention stores a game program. The game program causes a processor of a game apparatus to function as an object arranging means for arranging a first object and a second object in a three-dimensional virtual game world, and performing a movement control on at least one of the first object and the second object, a first game image display controlling means for generating a game image obtained by panoramically or planarly shooting the three-dimensional virtual game world with the virtual camera on the basis of an arrangement state by the object arranging means, and displaying it on a first display portion, a determining means for determining whether or not a positional relationship between the first object and the second object satisfies a predetermined condition in the three-dimensional virtual game world, and a second game image display controlling means for, when the determination result by the determining means is affirmative, setting the virtual camera on the basis of the first object position and the second object position in the three-dimensional virtual game world, generating a game image by shooting the three-dimensional virtual game world with the virtual camera, and displaying it on a second display portion.

In an example embodiment of this invention also, similarly to the invention of the fourth game apparatus, it is possible to appropriately display the game screen according to the game situations.

A fifth storage medium storing a game program according to an example embodiment of the present invention stores a game program. The game program causes a processor of a game apparatus to execute a determining step for determining whether or not a positional relationship between a first object and a second object in a two-dimensional coordinate system satisfies a predetermined condition, and a camera setting step for setting a virtual camera to be arranged in a three-dimensional virtual game world on the basis of the first object position and the second object position when the determination result by the determining step is affirmative.

In an example embodiment of this invention also, similarly to an example embodiment of the invention of the fifth game apparatus, it is possible to appropriately display the game screen according to the game situations.

A sixth storage medium storing a game program according to an example embodiment of the present invention stores a game program. The game program causes a processor of a game apparatus to function as an operation input detecting means for detecting an operation input by a player, an object controlling means for changing action relation data relating to a first object on the basis of the operation input detected by the operation input detecting means, a determining means for determining whether or not the operation input acceptable condition is satisfied in relation to the action relation data, and a game situation changing means for changing game situation data indicative of a game situation on the basis of the operation input detected by the operation input detecting means when it is determined that the input acceptable condition is satisfied by the determining means.

In an example embodiment of this invention also, similarly to an example embodiment of the invention of the sixth game apparatus, the player can participate in the game play at an appropriate timing.

A seventh storage medium storing a game program according to an example embodiment of the present invention stores a game program of a game apparatus having a first game image displaying means for displaying a first game image as to a first range in a virtual game world and a second game image displaying means for displaying a second game image as to a second range narrower than the first range in the virtual game world. The game program causes a processor of a game apparatus to execute a determining step for determining whether or not a positional relationship between a first object and a second object displayed on the first game image satisfies a predetermined condition, and a camera setting step for setting a position and a direction of a virtual camera to display the second game image on the basis of the first object position and the second object position which are displayed on the first game image when the determination result by the determining step is affirmative.

In an example embodiment of this invention also, similarly to an example embodiment of the invention of the seventh game apparatus, it is possible to appropriately display the game screen according to the game situations.

A eighth storage medium storing a game program according to an example embodiment of the present invention causes a processor of a game apparatus to function as a game image generating means for generating a game image including at least an object image on the basis of a three-dimensional coordinate of the object in a virtual game world, a mark coordinate calculating means for calculating a two-dimensional coordinate to combine a mark image with the game image on the basis of the three-dimensional coordinate of the object, a combining means for combining the mark image with the game image generated by the game image generating means in the two-dimensional coordinate calculated by the mark coordinate calculating means, an operation input detecting means for detecting an operation input from a player, and a game processing means for performing different game processes depending on whether or not the position indicated by the operation input detected by at least the operation input detecting means is on the mark image.

In an example embodiment of this invention also, similarly to an example embodiment of the invention of the eighth game apparatus, it is possible to enjoy playing the game with a simple operation.

A ninth storage medium storing a game program according to an example embodiment of the present invention stores a game program. The game program causes a processor of a game apparatus to function as a game image generating means for generating a game image including at least an object image by shooting a virtual game world with a virtual camera, and displaying it on a display portion, a calculation means for calculating a new three-dimensional coordinate by performing a predetermined arithmetic process on the basis of the three-dimensional coordinate of the object in the virtual game world, a screen coordinate transforming means for transforming the new three-dimensional coordinate calculated by the calculation means to a screen coordinate, a region setting means for setting a region on the display taking the screen coordinate transformed by the screen coordinate transforming means as a reference, a mark image display controlling means for combining a mark image corresponding to the region set by the region setting means with the game image, and displaying it on the display portion, a coordinate input means for making a player input coordinates on the display portion, and a game processing means for performing a predetermined game process by comparing the coordinate input by the coordinate input means and the region set by the region setting means.

In an example embodiment of this invention also, similarly to an example embodiment of the invention of the ninth game apparatus, the player can easily know the region to be operated.

A tenth storage medium storing a game program according to an example embodiment of the present invention stores a game program. The game program causes a processor of a game apparatus to function as a game image generating means for generating a game image to be displayed on a display portion by shooting a virtual game world with a virtual camera, a coordinate determining means for determining a coordinate on the display portion on the basis of three-dimensional coordinates of a plurality of objects in the virtual game world, a region setting means for setting a region on the display portion by taking the coordinate determined by the coordinate determining means as a reference, a mark image display controlling means for combining a mark image corresponding to the region set by the region setting means with the game image, and displaying it on the display portion, a coordinate input means for making a player input coordinates on the display portion, and a game processing means for performing a predetermined game processing by comparing the coordinate input by the coordinate input means and the region set by the region setting means.

In an example embodiment of this invention also, similarly to an example embodiment of the invention of the tenth game apparatus, the player can easily know the region to be operated.

A first game controlling method according to an example embodiment of the present invention includes following steps of (a) arranging a first object and a second object in a first virtual game world, and performing a movement control on at least one of the first object and the second object, (b) generating a game image panoramically or planarly representing the first virtual game world on the basis of an arrangement state by the step (a), and displaying it on a first display portion, (c) determining whether or not a positional relationship between the first object and the second object satisfies a predetermined condition in the first virtual game world, and (d) when the determination result by the step (c) is affirmative, setting a virtual camera in a three-dimensional second virtual game world on the basis of at least one of a first object position and a second object position in the first virtual game world, arranging at least one of the first object and the second object in the second virtual game world, generating a game image by shooting the second virtual game world with the virtual camera in such a manner as to include at least one of the first object and the second object which are arranged, and displaying it on a second display portion.

In an example embodiment of this invention also, similarly to an example embodiment of the invention of the first game apparatus, it is possible to appropriately display the game screen according to the game situations.

A second game controlling method according to an example embodiment of the present invention includes following steps of (a) arranging a first object and a second object in a two-dimensional virtual game world, and performing a movement control on at least one of the first object and the second object, (b) generating a game image representing the two-dimensional virtual game world on the basis of an arrangement state by the step (a), and displaying it on a first display portion, (c) determining whether or not a positional relationship between the first object and the second object satisfies a predetermined condition in the two-dimensional virtual game world, and (d) when the determination result by the step (c) is affirmative, setting a virtual camera in a three-dimensional virtual game world on the basis of at least one of a first object position and a second object position in the second virtual game world, arranging at least one of the first object and the second object in the three-dimensional virtual game world, generating a game image by shooting the three-dimensional virtual game world with the virtual camera in such a manner as to include at least one of the first object and the second object which are arranged, and displaying it on a second display portion.

In an example embodiment of this invention also, similarly to an example embodiment of the invention according to the second game apparatus, it is possible to appropriately display the game screen according to the game situations.

A third game controlling method according to an example embodiment of the present invention includes following steps of (a) arranging a first object and a second object in a three-dimensional virtual game world, and performing a movement control on at least one of the first object and the second object, (b) generating a game image shot by a virtual camera which is directed to a fixed direction on the basis of the arrangement state by the step (a), and shoots the three-dimensional virtual game world including at least one of the first object and the second object, and displaying it on a first display portion, (c) determining whether or not a positional relationship between the first object and the second object satisfies a predetermined condition in the three-dimensional virtual game world, and (d) when the determination result by the step (c) is affirmative, setting a virtual camera on the basis of at least one of the first object position and the second object position in the three-dimensional virtual game world, generating a game image by shooting the three-dimensional virtual game world with the virtual camera, and displaying it on a second display portion.

In an example embodiment of this invention also, similarly to an example embodiment of the invention of the third game apparatus, it is possible to appropriately display the game screen according to the game situations.

A fourth game controlling method according to an example embodiment of the present invention includes following steps of (a) arranging a first object and a second object in a three-dimensional virtual game world, and performing a movement control on at least one of the first object and the second object, (b) generating a game image obtained by panoramically or planarly shooting the three-dimensional virtual game world with the virtual camera on the basis of an arrangement state by the step (a) and displaying it on a first display portion, (c) determining whether or not a positional relationship between the first object and the second object satisfies a predetermined condition in the three-dimensional virtual game world, and (d) when the determination result by the step (c) is affirmative, setting the virtual camera on the basis of the first object position and the second object position in the three-dimensional virtual game world, generating a game image by shooting the three-dimensional virtual game world with the virtual camera, and displaying it on a second display portion.

In an example embodiment of this invention also, similarly to an example embodiment of the invention of the fourth game apparatus, it is possible to appropriately display the game screen according to the game situations.

A fifth game controlling method according to an example embodiment of the present invention includes following steps of (a) determining whether or not a positional relationship between a first object and a second object in a two-dimensional coordinate system satisfies a predetermined condition, and (b) setting a virtual camera to be arranged in a three-dimensional virtual game world on the basis of the first object position and the second object position when the determination result by the step (a) is affirmative.

In an example embodiment of this invention also, similarly to an example embodiment of the invention of the fifth game apparatus, it is possible to appropriately display the game screen according to the game situations.

A sixth game controlling method according to an example embodiment of the present invention includes following steps of (a) detecting an operation input by a player, (b) changing action relation data relating to an object on the basis of the operation input detected by the step (a), (c) determining whether or not the operation input acceptable condition is satisfied in relation to the first action relation data, and (d) changing game situation data indicative of a game situation on the basis of the operation input detected by the step (a) when it is determined that the input acceptable condition is satisfied by the step (c).

In an example embodiment of this invention also, similarly to an example embodiment of the invention of the sixth game apparatus, the player can participate in the game play at an appropriate timing.

A seventh game controlling method according to an example embodiment of the present invention is a game controlling method of a game apparatus having a first game image displaying means for displaying a first game image as to a first range in a virtual game world and a second game image displaying means for displaying a second game image as to a second range narrower than the first range in the virtual game world, and includes following steps of (a) determining whether or not a positional relationship between a first object and a second object displayed on the first game image satisfies a predetermined condition, and (b) setting a position and a direction of a virtual camera to display the second game image on the basis of the first object position and the second object position which are displayed on the first game image when the determination result by the step (a) is affirmative.

In an example embodiment of this invention also, similarly to an example embodiment of the invention of the seventh game apparatus, it is possible to appropriately display the game screen according to the game situations.

A eighth game controlling method according to an example embodiment of the present invention includes following steps of (a) generating a game image including at least an object image on the basis of a three-dimensional coordinate of the object in a virtual game world, (b) calculating a two-dimensional coordinate to combine a mark image with the game image on the basis of the three-dimensional coordinate of the object, (c) combining the mark image with the game image generated by the step (a) in the two-dimensional coordinate calculated by the step (b), (d) detecting an operation input from a player, and (e) performing different game processes depending on whether or not the position indicated by the operation input detected by at least the step (d) is on the mark image.

In an example embodiment of this invention also, similarly to an example embodiment of the invention of the eight game apparatus, it is possible to enjoy playing the game with a simple operation.

A ninth game controlling method according to an example embodiment of the present invention includes following steps of (a) generating a game image including at least an object image by shooting a virtual game world with a virtual camera, and displaying it on a display portion, (b) calculating a new three-dimensional coordinate by performing a predetermined arithmetic process on the basis of the three-dimensional coordinate of the object in the virtual game world, (c) transforming the new three-dimensional coordinate calculated by the step (b) to a screen coordinate, (d) setting a region on the display by taking the screen coordinate transformed by the step (c) as a reference, (e) combining a mark image corresponding to the region set by the step (d) with the game image, and displaying it on the display portion, (f) making a player input coordinates on the display portion, and (g) performing a predetermined game process by comparing the coordinate input by the step (f) and the region set by the step (d).

In an example embodiment of this invention also, similarly to an example embodiment of the invention of the ninth game apparatus, the player can easily know a region to be operated.

A tenth game controlling method according to an example embodiment of the present invention includes following steps of (a) generating a game image to be displayed on a display portion by shooting a virtual game world with a virtual camera, (b) determining a coordinate on the display portion on the basis of three-dimensional coordinates of a plurality of objects in the virtual game world, (c) setting a region on the display by taking the coordinate determined by the step (b) as a reference, (d) combining a mark image corresponding to the region set by the step (c) with the game image, and displaying it on the display portion, (e) making a player input coordinates on the display portion, and (f) performing a predetermined game processing by comparing the coordinate input by the step (e) and the region set by the step (c).

In an example embodiment of this invention also, similarly to an example embodiment of the invention of the tenth game apparatus, the player can know a region to be operated.

The above described objects and other objects, features, aspects and advantages of example embodiments of the present invention will become more apparent from the following detailed description of an example embodiments of the present invention when taken in conjunction with the accompanying drawings.

BRIEF DESCRIPTION OF THE DRAWINGS

FIG. 3 is an illustrative view showing one example of a game screen to be displayed on each LCD provided on the game apparatus shown in FIG. 1;

FIG. 7 is an illustrative view showing the other example of the game screen to be displayed on each LCD provided on the game apparatus shown in FIG. 1;

FIG. 11 is an illustrative view showing camera setting data, animation data, and model data stored in the data storage area shown in FIG. 10;

FIG. 12 is an illustrative view showing formation data, route data, and table data stored in the data storage area shown in FIG. 10;

FIG. 13 is an illustrative view showing encounter arrangement data and mark displacement data stored in the data storage area shown in FIG. 10;

DETAILED DESCRIPTION OF THE EXAMPLE EMBODIMENTS

Figure 1:
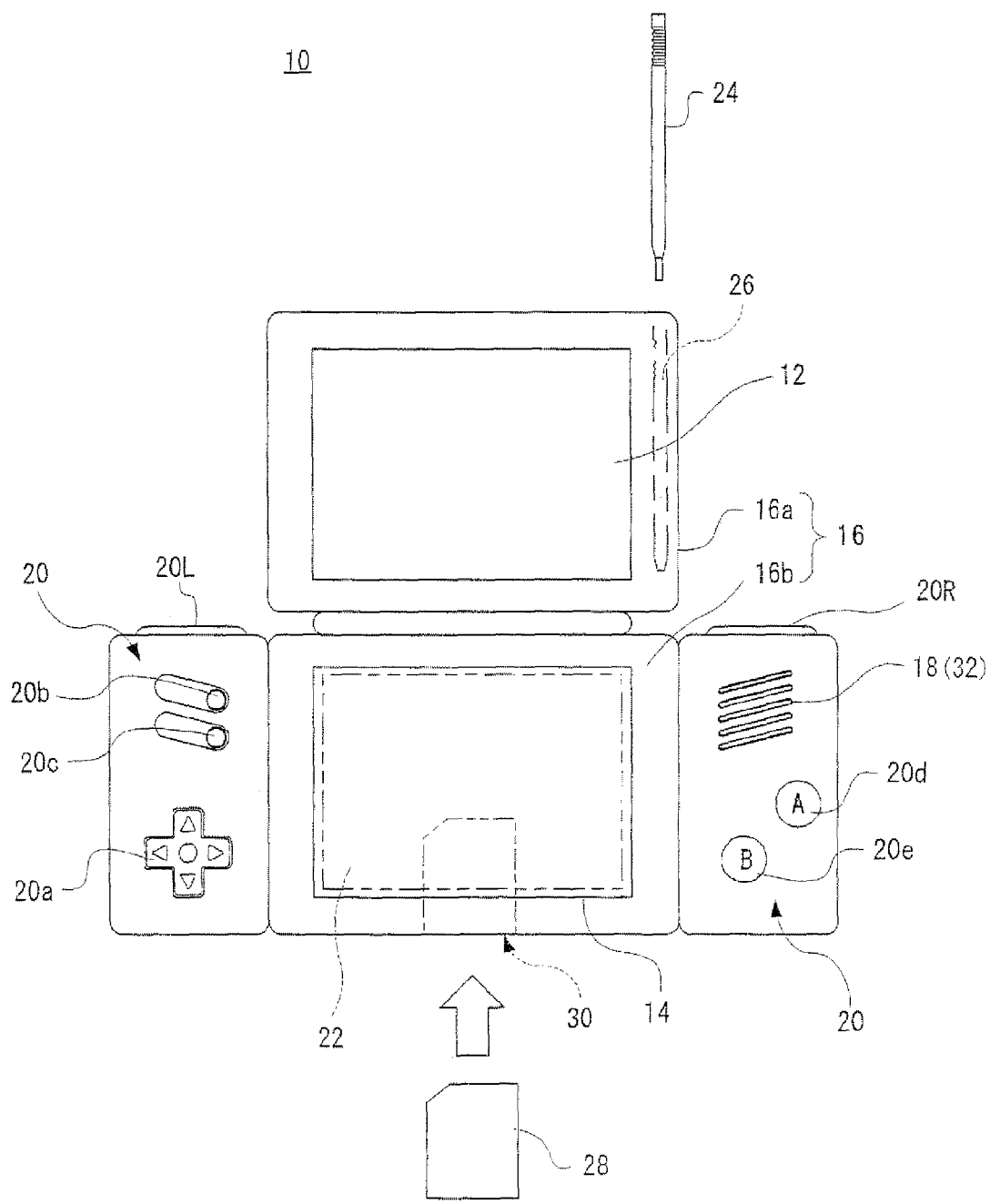
FIG. 1 is an illustrative view showing one example of a game apparatus of an example embodiment of the present invention.

Referring to FIG. 1, a game apparatus 10 as one embodiment of the present invention includes a first liquid crystal display (LCD) 12 and a second LCD 14. The LCD 12 and the LCD 14 are provided on a housing 16 so as to be arranged in a predetermined position in the housing. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Then, on the lower housing 16b, a sound emission hole 18 is formed, and operating switches 20 (20a, 20b, 20c, 20d, 20e, 20L and 20R) are provided.

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 22L, and an action switch (R button) 22R. The switch 20a, 20b, and 20c are arranged at the left of the LCD 14 on one surface of the lower housing 16*b*. Other switches 20*d* and 20*e* are arranged at the right of the LCD 14 on the one surface of the lower housing 16*b*. In addition, the switch 20L and the switch 20R are arranged at the right and left corners sandwiching the connected portion with the upper housing 16*a* on a part of the upper side surface (top surface) of the lower housing 16*b*.

The direction instructing switch 20*a* functions as a digital joystick, and is utilized for instructing a moving direction of a player character (or player object) to be operated by a game player and instructing a moving direction of a cursor, and so forth by operating any one of four depression portions. Also, the start switch 20*b* is formed by a push button, and is utilized for starting (restarting), temporarily stopping (pausing) a game, and so forth. The select switch 20*c* is formed by the push button, and utilized for a game mode selection, etc.

The action switch 20*d*, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20*e*, that is, the B button is formed by the push button, and is utilized for changing a game mode selected by the select switch 20*c*, canceling an action determined by the A button 20*d*, and so forth.

The action switch (left depression button) 20L and the action switch (right depression button) 20R are formed by the push button, and the left depression button (L button) 20L and the right depression button (R button) 20R can perform the same operation as the A button 20*d* and the B button 20*e*, and also function as a subsidiary of the A button 20*d* and the B button 20*e*.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In response to an operation by depressing, stroking, touching, and so forth with a stick 24, a pen (stylus pen), or a finger (hereinafter, referred to as "stick or the like 24") on a top surface (detection surface) of the touch panel 22, the touch panel 22 detects a coordinates of an operated position of the stick or the like 24 to output coordinates data corresponding to the detected coordinates.

In this embodiment, a resolution of the display surface of the LCD 14 (the same is true for the LCD 12) is 256 dots×192 dots, and a detection accuracy of the detection surface of the touch panel 22 is also rendered 256 dots×192 dots in correspondence to the resolution of the display surface. However, the detection accuracy of the detection surface of the touch panel 22 may be lower than the resolution of the display surface of the LCD 14, or higher than it.

It should be noted that a description below is made as to the detected coordinate of the touch panel 22 by taking the upper left corner as the original point (0, 0), the right horizontal direction as the positive or plus direction of the X-axis, and the downward vertical direction as the positive direction of the Y-axis (as with a case of the coordinates system of the LCD). Furthermore, as to the three-dimensional virtual game space (virtual game world), the X-Y coordinate is in the horizontal plane, and the Z axis is in the vertical direction to the horizontal plane.

Different game images (game screens) can be displayed on the LCD 12 and the LCD 14. For example, on one of the LCD (LCD 12, for example), a game screen for playing the game is displayed, and on the other LCD (LCD 14, for example), a game screen (operation screen) for inputting text for operating the game, and instructing icons can be displayed. Accordingly, the game player can input the textual (command) or instruct the icons (or predetermined images) on the screen of the LCD 14 by operating the touch panel 22 with the stick or the like 24.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens (12, 14) and the operating portions (20, 22) of two systems.

Also, in this embodiment, the stick 24 can be housed in the housing portion (housing slot) 26 provided in the proximity to the side surface (right side surface) of the upper housing 16*a*, for example, and taken out as necessary. However, if the stick 24 is not provided, the housing portion 26 also needs not to be provided.

Furthermore, the game apparatus 10 includes a memory card (or game cartridge) 28. The memory card 28 is detachable, and inserted into a loading slot 30 provided on a rear surface or a lower edge (bottom surface) of the lower housing 16*b*. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other to allow a CPU core 42 (see FIG. 2) of the game apparatus 10 to become accessible to the memory card 28.

Although not illustrated in FIG. 1, the speaker 32 (see FIG. 2) is provided at a position corresponding to the sound emission hole 18 inside the lower housing 16*b*.

Furthermore although omitted in FIG. 1, a battery accommodating box is provided on a rear surface of the lower housing 16*b*, for example, and a power switch, a volume switch, an external expansion connector, an earphone jack, etc. are provided on a bottom surface of the lower housing 16*b*.

Figure 2:
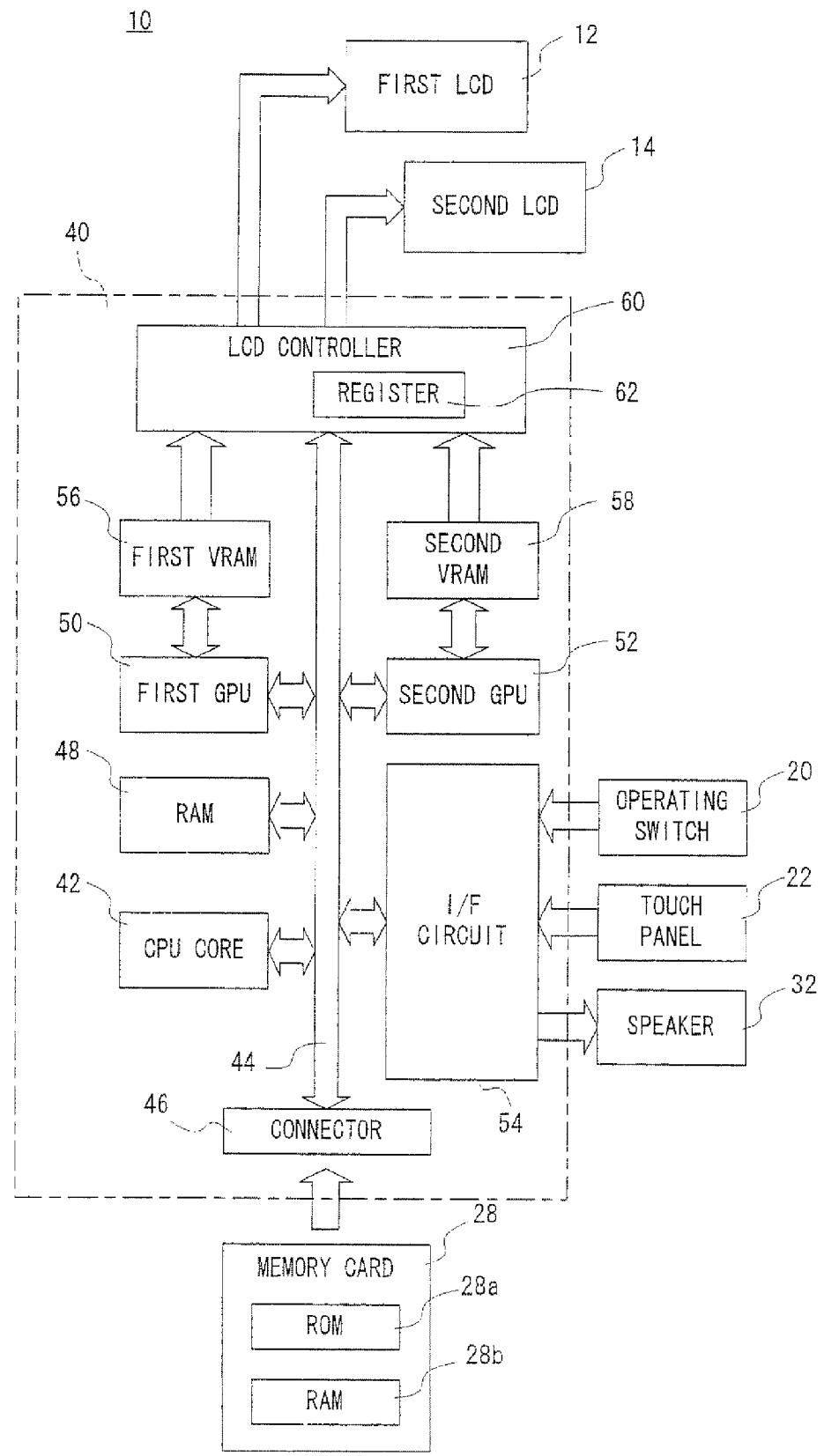
FIG. 2 is a block diagram showing an electric configuration of the game apparatus shown in FIG. 1.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the above-described connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28*a* and a RAM 28*b*, and although illustration is omitted, the ROM 28*a* and the RAM 28*b* are connected with each other via a bus and also connected with a connector (not shown) to be connected with the connector 46. Accordingly, the CPU core 42 gains access to the ROM 28*a* and the RAM 28*b* as described above.

The ROM 28*a* stores in advance a game program for a game (virtual game) to be executed by the game apparatus 10, image data (character image, background image, item image, icon (button) image, message image, etc.), data of the sound (music) necessary for the game (sound data), etc. The RAM (backup RAM) 28*b* stores (saves) proceeding data of the game, result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. Furthermore, the CPU core 42 executes a game process while storing data (game data, flag data) temporarily generated in correspondence with a progress of the game in the RAM 48.

Additionally, the game program, the image data, the sound data, etc. are stored (loaded) from the ROM 28a entirely at a time, or partially and sequentially so as to be stored into the RAM 48.

Each of the GPU 50 and the GPU 52 forms a part of a rendering means, is constructed by, for example, a single chip ASIC, and receives a graphics command from the CPU core 42 to generate game image data according to the graphics command. It should be noted that the CPU core 42 applies an image generation program (included in the game program) required to generate the game image data to both of the CPU 50 and GPU 52 in addition to the graphics command.

Furthermore, the GPU 50 is connected with a first video RAM (hereinafter referred to as "VRAM") 56, and the GPU 52 is connected with a second VRAM 58. The GPU 50 and the GPU 52 respectively access the first VRAM 56 and the second VRAM 58 to obtain necessary data (image data: character data, texture data, etc.) necessary for executing the graphics command. Also, the CPU core 42 writes image data necessary for rendering to the first VRAM 56 and the second VRAM 58 via the GPU 50 and the GPU 52. The GPU 50 accesses the VRAM 56 to create game image data for rendering, and the GPU 52 accesses the VRAM 58 to create game image data for rendering.

The VRAM 56 and the VRAM 58 are connected to the LCD controller 60. The LCD controller 60 includes a register 62, and the register 62 consists of, for example, one bit, and stores a value of "0" or "1" (data value) according to an instruction from the CPU core 42. The LCD controller 60 outputs the game image data created by the GPU 50 to the LCD 12, and outputs the game image data created by the GPU 52 to the LCD 14 in a case that the data value of the register 62 is "0". Also, the LCD controller 60 outputs the game image data created by the GPU 50 to the LCD 14, and outputs the game image data created by the GPU 52 to the LCD 12 in a case that the data value of the register 62 is "1".

Additionally, the LCD controller 60 directly reads the game image data from the VRAM 56 and the VRAM 58, or reads the image data from the VRAM 56 and the VRAM 58 via the GPU 50 and the GPU 52.

Furthermore, in this embodiment, mainly, a two-dimensional still image of a relatively wide range of the virtual game world and an explanation screen for explaining an operation procedure to a game player are displayed on the LCD 12 (upper screen), and a three-dimensional motion image (animation) as to a relatively narrow range of the virtual game world is displayed on the LCD 14 (lower screen).

The I/F circuit 54 is connected with the operating switch 20, the touch panel 22, and the speakers 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, the coordinates data output from the touch panel 22 is input to the CPU core 42 via the I/F circuit 54. In addition, the CPU core 42 reads from the RAM 48 the sound data necessary for the game, such as a game music (BGM), a sound effect or voices of a game character (onomatopoeic sound), etc., and outputs it from the speaker 32 via the I/F circuit 54.

In the game apparatus 10 of such a configuration, sports action games, such as an American football, for example, can be played. Although illustration is omitted, in a huddle (strategy) mode, a screen for selecting kinds of offence (running, passing, kicking (punting), etc.), and a running player (object) and passing player is displayed on the LCD 14. Briefly speaking, on the screen, if a team operated by a game player (hereinafter, referred to as "own-team") takes possession of the ball (the offence), a plurality of touch switches for representing the kinds of the offence are displayed, and the kind of offence is determined depending on which touch switch is touched. Next, a plurality of touch switches for representing players are displayed, and a game player is selected depending on which touch switch is touched. Similarly thereto, a formation of the own-team is selected. If the own-team does is the defense, since a plurality of touch switches representing the kinds of offence are displayed, the player predicts which kind of offence is selected by the team operated by the opposition (another game player or computer (CPU core 42)) (hereinafter referred to as "opposing team") and touches any touch switch. Then, a plurality of touch switches representing players are displayed, and the player predicts which game player is selected by the opposing team, and touches any touch switch.

On the other hand, in a case that the own-team is the offense, processes for the offense prediction and the player prediction are performed in another game apparatus 10' (not illustrated) operated by another game player as described above, or automatically performed by a computer at random or according to a predetermined algorithm. Also, in a case that the own-team is the defense, processes of determination of the offense kind and a player selection on the offensive team are performed in another game apparatus 10' (not illustrated) operated by another game player as described above, or are automatically performed by a computer at random or according to a predetermined algorithm. As described later, depending on the coincidences between the contents of the kind of offense and the selecting player on the offense team and the contents of the offense prediction and the player prediction on the defense team, the contents of the encountering of the defense are determined. Here, the encountering means that the RB encounters the DF.

Thus, when the kind of the offence and the player are selected, or a process of the offense prediction and the player prediction on the defensive team is performed, a set mode is set to display a game screen 100 and a game screen 120 as shown in FIG. 3. Furthermore, although omitted in FIG. 3, the touch panel 22 is set on the LCD 14 as described above.

Briefly speaking, the game screen 100 simply displays a scrimmage state in a two-dimensional (2D) manner. More specifically, on the basis of arrangement data (two-dimensional coordinate) of the two-dimensional game space by the formation data, an offensive formation of the team to be operated by the game player (hereinafter referred to as "own-team") and a defensive formation of the team to be operated by the opposition (another game player or computer (CPU core 42)) (hereinafter referred to as "opposing team") are shown on opposite sides of a line of scrimmage. More specifically, the own-team is displayed in offensive formation below the line of scrimmage, and the opposing team is displayed in the defensive formation above the line of scrimmage.

Furthermore, although the line of scrimmage is shown by the dotted line in FIG. 3, it needs not to be displayed on the actual game screen 100.

Also, in the FIG. 3 example, the T formation is shown as an offensive formation, and the 4-3 formation is displayed as a defensive formation. However, in this embodiment, the formation of each team is determined in advance as described later. Of course, the formation of each team can be selected from a plurality of options.

As can be understood from FIG. 3, in order to simplify an understanding, on the game screen 100 to be displayed on the LCD 12, the object of the own-team and the object of the opposing team are displayed by different kinds of face images in this embodiment. Furthermore, on the game screen 100, the game world of relatively wide range is displayed by taking the line of scrimmage as a reference. For example, the respective objects arranged on the basis of the formation data described later can entirely be displayed in the two-dimensional game world.

Also, on the game screen 120, a three-dimensional (3D) image (animation) when the scrimmage sate is viewed from a direction oblique and reward of the quarterback (QB) of the own-team is displayed. However, the respective objects are arranged in the three-dimensional game world on the basis of the arrangement data in the two-dimensional game world. More specifically, a three-dimensional coordinate of each object is calculated on the basis of a two-dimensional coordinate indicated by the formation data of each object (position). For example, the coordinate (z) in a heightwise direction according to a body height of each object is added to the two-dimensional coordinate (x, y) of each object to obtain a three-dimensional coordinate (x, y, z) of each object. Now, here, the arrangement position (position coordinates) of the virtual camera is determined in a direction oblique and reward of the three-dimensional coordinate of the QB obtained described before, and the direction of the virtual camera (center of interest) is determined along the line of sight of the QB (direction of opponent's goal vertical to the line of scrimmage).

However, the animation is not limited to that when being viewed from a direction oblique and reward of the QB, and the animation showing that the scrimmage state is panoramically viewed or that the scrimmage state is viewed by the QB's line of sight may be appropriate. That is, a position and a direction of the virtual camera need not to be limited.

Also, in the drawings, the game screen 120 (animation) is displayed by a still image at a certain point. Hereafter, this holds true for displaying an animation (motion image).

For example, when a process of making the QB call "Hut!" is performed in the scrimmage state, the game player clicks (makes a touch-on or a touch-off in a relatively short period) the QB (another player is appropriate) at a desired timing to thereby start an offensive process. However, the voice of the QB may be output by a sound, may merely be displayed on the game screen 120 (or game screen 100) by a text display, or may be output through execution of both of them.

Figure 4:
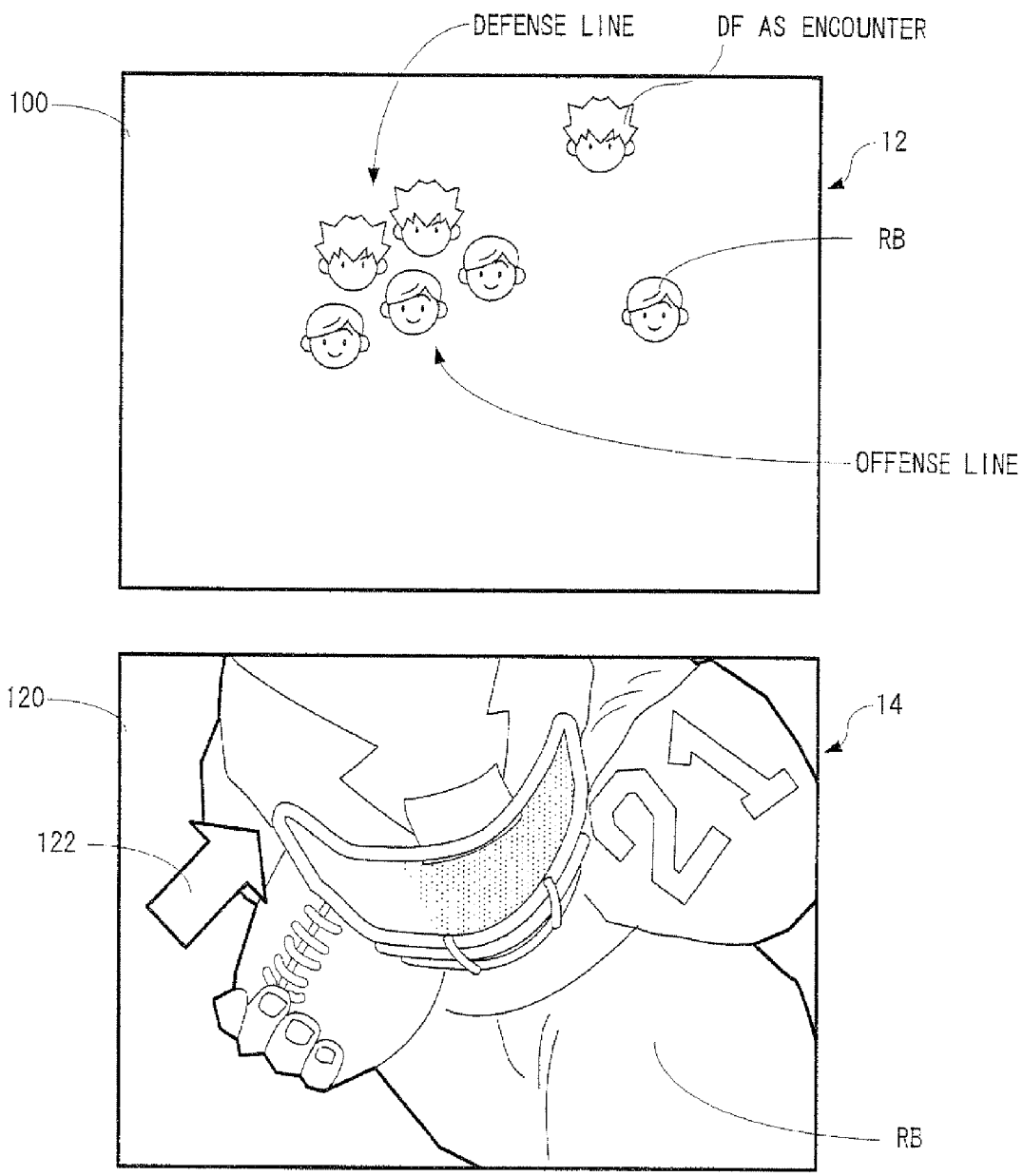
FIG. 4 is an illustrative view showing another example of the game screen to be displayed on each LCD provided on the game apparatus shown in FIG. 1.

After the offensive process is started, in a case that the running is selected in the huddle mode, a two-dimensional coordinate (two-dimensional position) of each object is automatically updated at regular time intervals (one frame: screen updating rate) without game player's operation, and a face image of each object is displayed on the game screen 100 in the updated two-dimensional position as shown in FIG. 4. That is, the face image of each object is displayed in a moving manner. Furthermore, a suitable area in the game world is displayed. For example, in accordance with the movement of the RB, the surrounding area of the RB is displayed (scrolled). Accordingly, the game player can know the condition of the current field, such as a changing arrangement state of the object on the game screen 100. However, in this embodiment, as described later, the positions of the QB and the running back (RB) are updated so as to move in the route determined in advance according to the formation at first. On the other hand, the defense (DF) as an encounter (a DF who encounters the RB) described later moves closer to the RB. Furthermore, the position of the object on the offensive line is updated so as to move to the nearest object on the defensive line. Accordingly, on the game screen 100 shown in FIG. 4, a state in which the objects on the offensive line and the object on the defensive line are bumped with each other is also displayed.

Noted, as can be understood from FIG. 4, in this embodiment, after the running play is started, the objects except for the QB (omitted in FIG. 4), the RB, the DF as an encounter, the object on the offensive line, and the other object on the defensive line (hereinafter referred to as "other object") are not displayed on the game screen 100. Thus, the two-dimensional coordinate as to the object is not updated.

On the other hand, although illustration is omitted, after an elapse of a fixed time period from the start of the offensive process, an animation showing that the QB hands the ball to the RB, and the RB receives the ball and then starts to run is displayed on the game screen 120. Additionally, at this time, the above-described situation is displayed on the game screen 100 by the two-dimensional image. Then, as shown in FIG. 4, an image obtained by superposing an arrow image 122 on an animation image (motion image) showing that the RB is running is displayed as a game screen 120. Also, the arrow image 122 is a still image. Although detailed description will be omitted, the arrow image 122 indicates a moving (running) direction of the RB on the game screen 100 (field), and the game player can increase a moving speed of the RB in the game world by performing a scratch operation on the game screen 120 (touch panel 22) in the direction. That is, it is possible to increase a gain (gains yardage).

Also, in this embodiment, the arrow image 122 is displayed, and in response to a scratch operation thereon, the moving speed of the RB is increased, but the operation, etc. may not be performed. In such a case, the arrow image 122 needs not to be displayed.

Next, when the RB moving according to route is closer to the range of a fixed distance (fixed distance A, for example) from the line of scrimmage, the DF to be encountered is arranged.

Additionally, the DF to be encountered at first is arranged when the RB is closer to the range of the fixed distance A from the line of scrimmage, and another DF to be encountered next is arranged at the second time and the subsequent when the distance by which the RB moves in the game world after running through the DF as a previous encounter exceeds the fixed distance (fixed distance D, for example).

Additionally, although different characters are applied to the fixed distance A and the fixed distance D for purposes of explanation, the same value may be set, and different values may be set.

Figure 5:
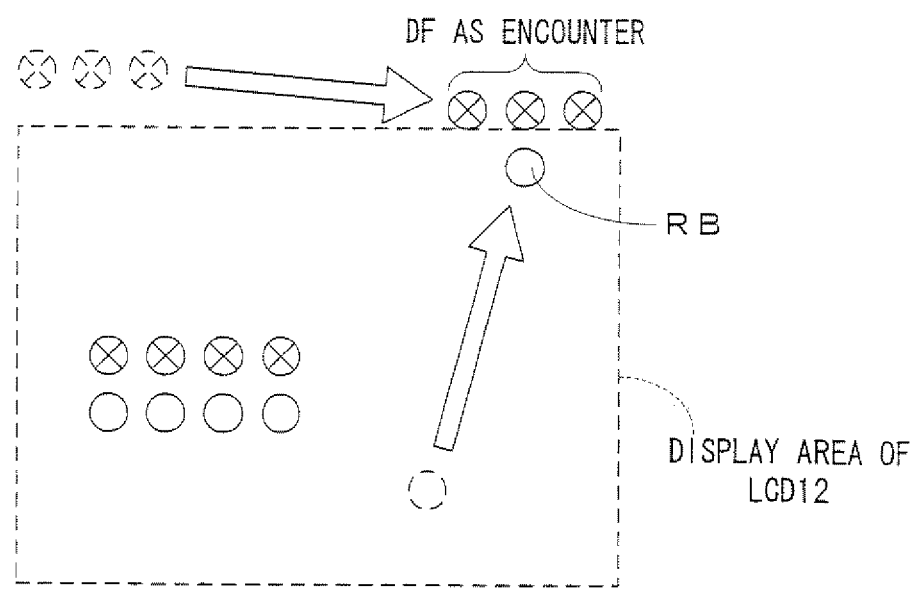
FIG. 5 is an illustrative view for illustrating an updating method of a two-dimensional coordinate of an object when the game screen to be displayed on a first LCD is generated.

As shown in FIG. 4, for example, the DF to be encountered is placed in the position corresponding to the direction of travel of the RB from the current position of the RB, and near the exterior edge of the area displayed on the game screen 100 in the game world (the position outside the area and in contact with the area, the position outside the area and spaced a predetermined distance from the area, or the position within the area and in contact with the area). Accordingly, as shown in FIG. 5, in a case that the RB moves to the oblique upper right in the field, the DF to be encountered is arranged near the right corner of the exterior edge of the display area in the game world. That is, the DF to be encountered is arranged near the exterior edge of the display area on the game screen 100 and in such a position as to halt the progress of the RB. Also, the DF to be encountered is selected out of the DFs (the object except for the QB, the RB, the DF to be encountered, the object on the offensive line and the object on the defensive line) which are not displayed at a start of the offense (the linebacker (LB), the defense back (DB), the cornerback (CB), safety (S), etc.) The selection is performed according to priorities determined in advance, or selected at random. Additionally, the DF which was arranged as an encounter and run through by the RB once is not selected.

As can be understood from FIG. 5, the DF to be encountered is forcibly arranged in the position to be encountered irrespective of the current position in the game world. This is because that after start of the running plays, the objects except for the QB, the RB, the offensive line, and the defensive line are not displayed on the game screen 100, and the two-dimensional coordinate thereof are not also updated as described above.

Additionally, in a case that the RB is set so as to move along the route determined in advance, or moves according to a predetermined algorithm, a prediction process of the moving destination of the RB is performed to thereby arrange the DF to be encountered in the predicted position.

As described in detail later, the number of encounterings and the number of DFs to be encountered are determined when in the huddle mode, the offense determines the offensive contents, and the defense predicts the offensive contents in response thereto.

The DF to be encountered is thus arranged, and the two-dimensional coordinate of the object is further updated. That is, the RB automatically runs upwardly on the game screen 100 according to the algorithm determined in advance while the DF to be encountered runs downwardly on the game screen 100 so as to be closer to the RB. Then, as can be understood from the game screen 100 shown in FIG. 6, when the position of the RB and the position of the DF to be encountered falls in the range of a fixed distance (fixed distance B<the fixed distance A, here), an encounter mode is set.

In the encounter mode, a three-dimensional coordinate of each object is calculated on the basis of a two-dimensional coordinate of each of the object. A calculation method of the three-dimensional coordinate is the same as that in the above-described set mode, but, in the encounter mode, only the three-dimensional coordinates of the RB and the DF to be encountered (hereinafter referred to as "object relating to the encounter") are calculated. That is, as described later, only the object relating to the encounter is arranged in the three-dimensional game world. When the three-dimensional coordinate of the object relating to the encounter is calculated, the object relating to the encounter is modeled in the three-dimensional coordinate. Also the position of the virtual camera is set to the three-dimensional coordinate (position of the eyes) of the RB, and the direction of the virtual camera is further determined in the direction of the three-dimensional coordinate of the DF to be encountered. It should be noted that if a plurality of DFs to be encountered exist, the direction of the virtual camera is determined in such a direction as to be directed to a three-dimensional coordinate of one of DFs (the center thereof, for example), or to the average three-dimensional coordinate. Accordingly, as shown in FIG. 7, an animation (three-dimensional image) showing that the DF to be encountered moves closer is displayed on the game screen 120.

Also, the direction of the virtual camera may be the direction (the vertical direction is fixed direction) in the three-dimensional game world corresponding to the moving direction of the RB in the two-dimensional game world, and in a case that the direction of the RB is set in the two-dimensional game world, may be the direction of the three-dimensional game world corresponding to the direction.

Furthermore, in this embodiment, in order to simply display the DF to be encountered, the position of the virtual camera is determined on the basis of the three-dimensional coordinate of the RB, and the direction of the camera is determined in such a direction as to view the DF to be encountered from the RB. However, the position and the direction of the virtual camera need not to be limited thereto.

For example, it may be determined on the basis of the two-dimensional coordinate of the RB. Also, for example, the position of the virtual camera may be determined on the basis of the three-dimensional coordinate (two-dimensional coordinate is possible) of the DF to be encountered (one or more DFs for a plurality of DFs). Or, the position of the virtual camera can be determined on the basis of the three-dimensional coordinate (two-dimensional coordinate is possible) of the RB and the DF to be encountered.

Additionally, the direction of the virtual camera can be set such that both of the RB and the DF to be encountered are displayed on the game screen 120. For example, the position of the virtual camera is set behind the RB in such a direction as to shoot the RB and the DF to be encountered (face direction and the direction of travel of the RB). In this case, the subjective game image 120 of the RB is displayed. Also, the direction of the virtual camera can be set in a direction parallel with the horizontal direction including the midpoint between the RB and the DF to be encountered (middle point) and a direction from which the virtual camera can shoot the RB and the DF to be encountered (direction vertical to the direction of the faces of the RB and the DF (in the direction of travel)). In this case, a game screen 120 obtained by viewing a scene that the RB and the DF moves closer to and bumped with each other from a side is displayed.

Also, on the game screen 120 shown in FIG. 7, a plurality of mark images 124 are displayed. The display position of each of the mark images 124 is calculated on the basis of the three-dimensional coordinates of the DF to be encountered (object). First, a three-dimensional coordinate relating to the mark image is calculated from the three-dimensional coordinate of the DF to be encountered. Then, the calculated three-dimensional coordinate is transformed into a screen coordinate (projection transformation), and the mark image 124 is arranged in the calculated screen coordinate. Accordingly, the mark image 124 is combined (superposed on) with the game image displayed in a three-dimensional manner.

On the other hand, an explanation as to a manner of operation in the encounter mode is displayed on the LCD 12 as the game screen 100. For example, a message showing that the center of the mark image 124 is to be touched is displayed, and a message indicative showing that if an accurate touch is performed, the RB can run through the DF is displayed.

Here, when the game player touches the mark image 124 on the game screen 120, the right and wrong (success/failure) of the touch is determined. In a case that the center of the mark image 124 is touched, it is determined that the touch of the mark image 124 succeeds. However, if a position away from the center of the mark image 124 and an area except for the mark image 124 are touched, it is determined the touch of the mark image 124 fails.

In addition, in a case that the touch of the mark image 124 succeeds, the succession and failure of the offence is determined according to the quickness of the touch and the accuracy of the touch (touch position). More specifically, depending on the quickness of the touch and the accuracy of the touch (touch position), the moving distance of the RB (moving distance in running through the DF to be encountered) is determined. For example, the shorter the time from the display of the mark image 124 to the touch of the mark is, or the closer the mark image 124 is to the center, the moving distance is made longer. Accordingly, when the center of the mark image 124 is touched well in a brief time, the RB can gain yardage ahead of the DF, and can run through the DF. On the other hand, if it takes a long time from the display of the mark image 124 to touch of the mark, or if a position relatively away from the center of the mark image 124 is touched, or if the touch of the mark image 124 fails as described above, the RB is caught by the DF, or is tackled by the DF, and results in failure of the offence. Thus, in the encountering mode, a mini game is executed according to game player's touch operation, and depending on the result (result of the mini game) of the touch operation, the game progress (game situation) of the American football is changed.

Here, a description is made on the arrangement position of the mark image 124 in detail. If the DF to be encountered is three, the mark image 124 is displayed between the adjacent two DFs. As to the DFs at both ends, by placing virtual DFs outside them, the mark image 124 is displayed between the virtual DF and the DF to be encountered. The mark image 124 is displayed in the middle position (midway) between the two adjacent DFs (including the virtual DF), and the size is determined depending on the distance between the adjacent DFs and the distance between the RB and the DF. This is because the easiness of running through is taken into consideration when the RB runs through the DF in the actual American football game. For example, as the distance between the adjacent DFs is long, the RB relatively easily runs through the distance. Also, if the distance between the RB and the DF is far, the RB is difficult to tackle by the DF, and the RB is difficult to catch by the DF. Accordingly, if the distance between the two adjacent DFs and the distance between the RB the DF is long, the size of the mark image 124 is made large. Conversely, if the distance is short, the size of the mark image 124 is made small. For example, depending on the length of the distance, the radius (diameter) of the mark image 124 may be determined linearly (or gradually). Thus, the easiness of running through the DF (or difficulty of running through) is represented by easiness of touching (or difficulty of touching). It should be noted that the size of the mark image may be determined depending on the ability parameter of the DF to be encountered.

Figure 8:
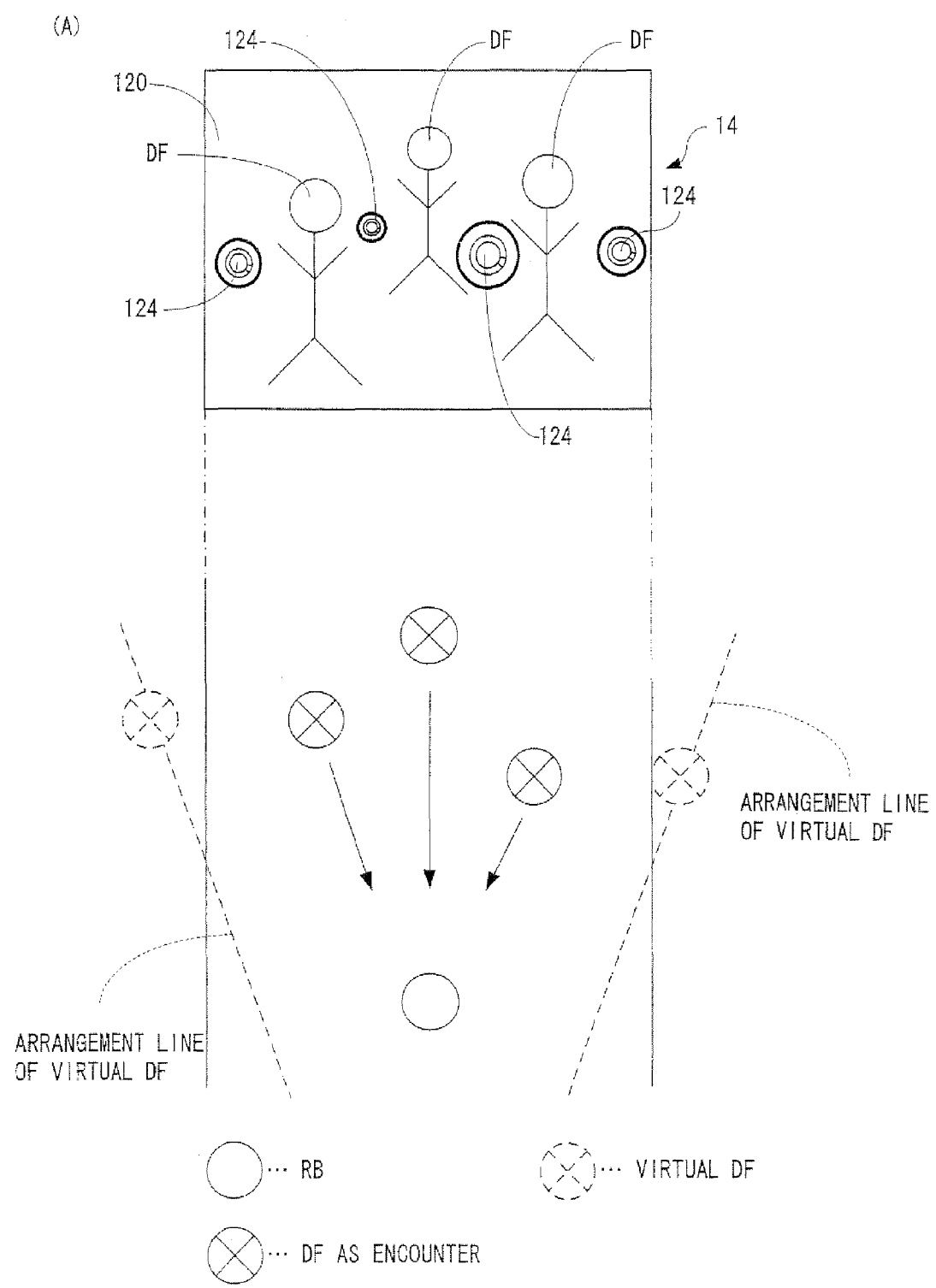
FIG. 8 is an illustrative view showing the other example of the game screen to be displayed on a second LCD provided on the game apparatus shown in FIG. 1, and for showing a mark display method.

More specifically, if a positional relationship between the DF and the virtual DF is FIG. 8 (B), a game screen 120 shown in FIG. 8 (A) is displayed. Additionally, although the DF is illustrated planarly and simply in FIG. 8 (A), a three-dimensional game screen 120 as shown in FIG. 7 is actually displayed. Also, in FIG. 8 (B), for simplicity, the positional relationship of the objects (RB, DF) is illustrated in a two-dimensional manner. As shown in FIG. 8 (B), each of the virtual DF is arranged on an arrangement line, and in a position in parallel with each of the both ends of DFs (vertical to the moving direction of the RB). As can be understood from FIG. 8 (B), the arrangement line is obliquely provided such that the closer the DF and the RB is, the closer the virtual DF moves to the RB. This is because that when the DF is moved closer to the RB, and the DF is near the RB, the mark image 124 is displayed in a relatively small size. That is, as shown by the solid line in FIG. 8 (B), if the two arrangement lines are placed in parallel with each other, as the DF is closer to the RB, the mark images 124 on both sides shown in FIG. 8 (A) are made large.

In addition, although not illustrated in the drawings, the mark image 124 is displayed in a vibrated manner on the basis of the difference (small and large) between the ability value (speed, power, technique) of the RB and the ability value of the DF. For example, if the ability value of the DF is larger than the ability value of the RB, the display position of the mark image 124 is moved from right to left or left to right each time that the game screen 120 is updated. More specifically, the value of the X-coordinate (coordinate in the horizontal direction of the game screen 120) of the position coordinates of the mark image 124 is changed for each frame. However, as described above, since the mark image 124 is displayed in the middle point between the two adjacent DFs, if the ability value of any of the DF is larger than the ability value of the RB, the mark image 124 is vibrated.

Although a detailed description will be omitted, the small and large of the ability value may be obtained by making a comparative judgment of in each of the parameters, and a total value of all the parameters may be calculated so as to make a comparative judgment. The method of the comparative judgment is set by a developer and a programmer of the game.

Although illustration is omitted, in this embodiment, the vibration-display of the mark image 124 to the right and left direction (horizontal) on the game screen 120 makes it difficult to perform a touch operation, that is, makes it difficult to run through the DF with a high ability value. However, it needs not to be limited thereto, and the mark image 124 may be displayed in a vibrating manner up and down (vertically) on the game screen 120, the mark image 124 is displayed in a blinking manner, or the mark image 124 may be translucently displayed.

Furthermore, in the huddle mode, although the passing and panting can be selected, a description is simply made on a case that the passing is selected below, and a description made on a case that the panting is selected will be omitted.

When the passing is selected in the huddle mode, and the QB on the game screen 120 is clicked in the scrimmage state as shown in FIG. 3, the offence is started, and the passing mode is set. Although illustration is omitted, a game screen 120 in which a mark image is displayed so as to be superposed on the three-dimensional image of the receiver object to which the QB can pass the ball is displayed. For example, the position and the size of the mark image are changed according to the positional relationship between the receiver and the DF. As the touch position is closer to the center of the mark image, the passing becomes more successful. The game player touches the mark image which is displayed so as to be superposed on a desired receiver such that the QB passes the ball to the desired receiver. Then, the QB passes (throws) the ball to the receiver.

Also, when the QB passes the ball to the receiver, a receiving mode is set. In the receiving mode, the game player makes an operation to make the receiver have an advantageous place to catch a ball. Although illustration is omitted, a scratch area is provided on the game screen 120, and by rubbing the scratch area in a brief time (scratching), a gage is increased. Depending on the value of the gage, the advantage of catching the ball is determined.

When the ball moves sufficiently closer to the receiver, the catching mode is set. In the catching mode, the game player instructs the receiver selected in the passing mode to catch the ball. Although the illustration is omitted, in the receiving mode, a game screen 120 in which the mark image is displayed so as to be superposed on the ball is displayed. Additionally, as to the game screen 120, as the ball moves closer to the receiver, the mark image is displayed so as become large. However, as the mark image is larger, the moving speed of the ball is increased. Thus, the mark image has to be touched at the right time. Also, depending on the catching ability of the receiver, the size of the mark image is changed. If the center of the mark image can be clicked, the receiver catches the ball. However, if the receiver cannot have the advantageous place for catching the ball, and if the ability value of the enemy DF is larger than the ability value of the receiver in the receiving mode, the receiver fails to catch the ball, or the pass is cut off or intercepted.

Figure 9:
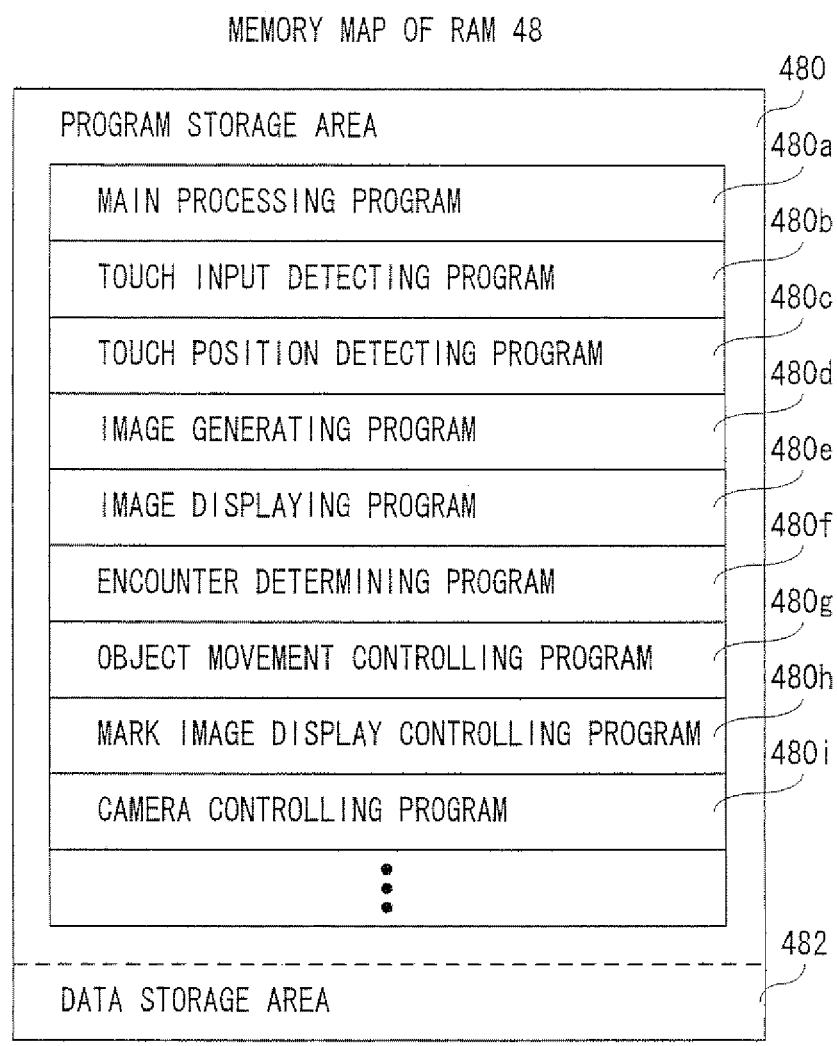
FIG. 9 is an illustrative view showing a memory map of a RAM shown in FIG. 2.

FIG. 9 shows an illustrative view showing one example of a memory map of the RAM 48 in FIG. 2. With reference to FIG. 9, the RAM 48 includes a program storage area 480 and a data storage area 482. In the program storage area 480, a game programs is stored, and the game programs comprises a main processing program 480a, a touch input detecting program 480b, a touch position detecting program 480c, an image generating program 480d, an image displaying program 480e, an encounter determining program 480f, an object movement controlling program 480g, a mark image display controlling program 480h, a camera controlling program, etc.

The main processing program 480a is a program for performing a main routine of a game (American football in this embodiment). The touch input detecting program 480b is a program for detecting a touch input. More specifically, when executing the touch input detecting program 480b, the CPU core 42 executes a reading process of the coordinate data stored in the coordinate data buffer (not illustrated) provided in the I/F circuit 54. Here, if the coordinate data is not stored, and cannot be read, it is determined that the touch input is absent. On the other hand, if the coordinate data is stored, the CPU core 42 reads the coordinate data to determine that the touch input is present, and stores the read coordinate data in the data storage area 482.

The touch position detecting program 480c is a program for determining that the coordinate indicated by the touch input indicates which position on the game screen 120. In this embodiment, as described above, since the resolution of the LCD 14 and the detection accuracy of the touch panel 22 is the same, and the same coordinates system is set, by directly utilizing the coordinate indicated by the coordinate data detected according to the touch input detecting program 480b, it is easily know which position on the game screen 120 is touched.

The image generating program 480d is a program for generating images such as a moving image object appearing in the game (player, ball, etc.) and a background object like a field by utilizing image data (model data including bone data and polygon data, texture data, etc.). Also, in this embodiment, the image generating program 480d can also be executed in a case that a game screen 100 is generated by pasting a texture image (face image) generated in advance. The image displaying program 480e is a program for displaying the image generated according to the image generating program 480d.

The encounter determining program 480f is a program for determining the number of encounterings and the number of DFs to be encountered in each encountering from the offensive contents selected by the game player and the predicted contents of the defense in the huddle mode by utilizing table data 482g (see FIG. 12(C)) described later. The object movement controlling program 480g is a program for updating the two-dimensional coordinate of each object. For example, as to a part of the object (RB), the two-dimensional coordinate is updated according to route data 482f (see FIG. 12(B)) determined in advance.

The mark image display controlling program 480h is a program for determining a display position and a size of the mark image 124 and combining it with the game image. The camera controlling program 480i is a program for controlling a position and a direction of the virtual camera in the three-dimensional world on the basis of the two-dimensional coordinate of the RB when the positions of the RB and the enemy DF arranged according to the two-dimensional coordinate satisfy a predetermined relationship. In this embodiment, the satisfaction of the predetermined relationship is determined whether the distance between the RB and the DF to be encountered falls in the range of the fixed distance B.

Although illustration is omitted, in the program storage area 480, a game sound reproducing program, a backup program, etc. are also stored. The game sound reproducing program is a program for generating a sound necessary for the game such as a voice (sound) of the character, a sound effect, a BGM, etc. and outputting it. The backup program is a program for storing (saving) the game data (proceeding data, result data) generated during the game according to a predetermined event and a predetermined operation in the RAM 28b of the memory card 28.

Figure 10:
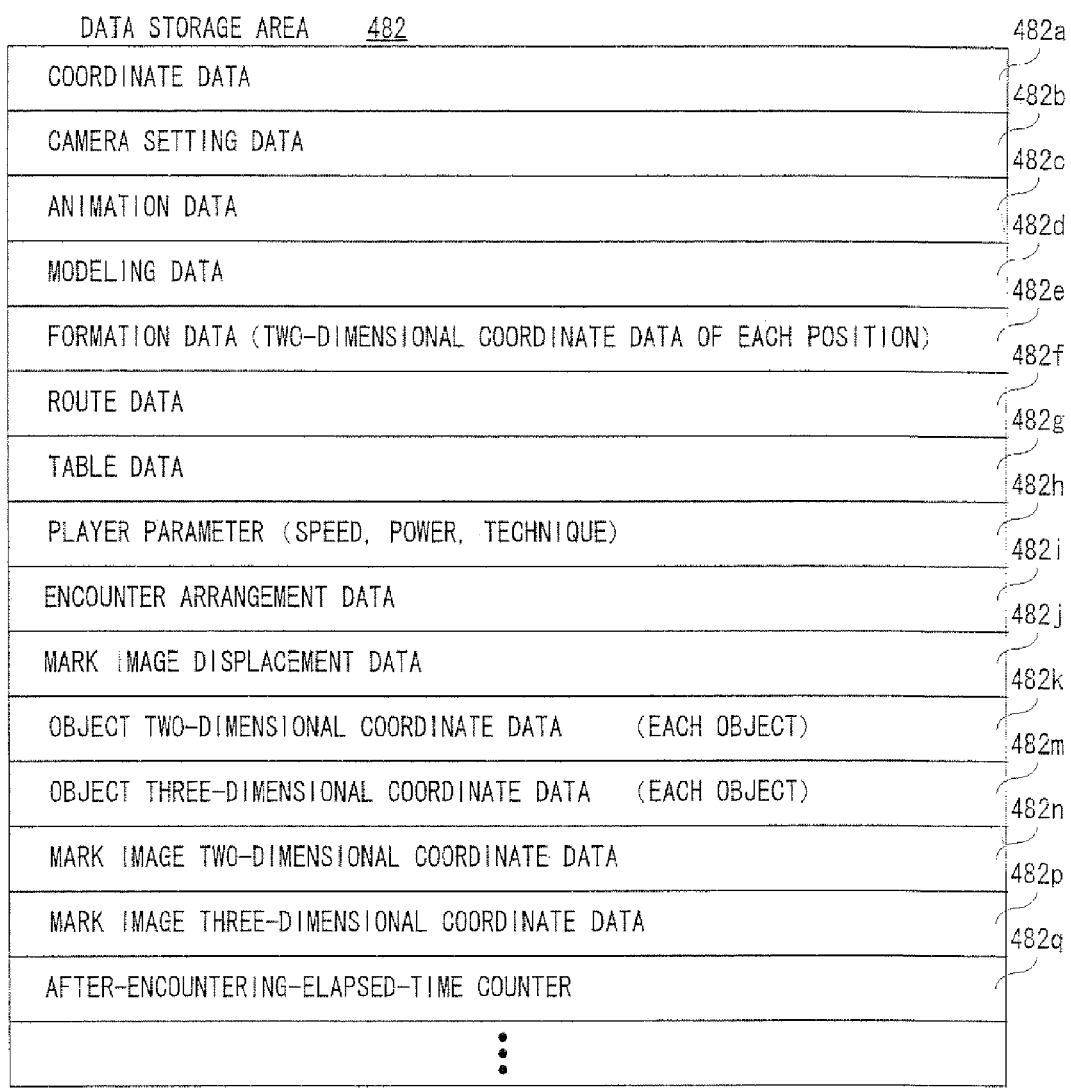
FIG. 10 is an illustrative view showing detail of a data storage area shown in FIG. 9.

The data storage area 482 is utilized as a storage area, working area, or buffer area of the CPU core 42. For example, as shown in FIG. 10, coordinate data 482a, camera setting data 482b, animation data 482c, model data 482d, formation data 482e, route data 482f, table data 482g, player parameter 482h, encounter arrangement data 482i, mark displacement data 482j, object two-dimensional coordinate data 482k, object three-dimensional coordinate data 482m, mark image two-dimensional coordinate data 482n, mark image three-dimensional coordinate data 482p, etc. are stored. Also, the data storage area 482 is also provided with an after-encountering-elapsed-time counter 482q.

The coordinate data 482a is coordinate data of a touch coordinate, and detected according to the above-described touch input detecting program 480b. The camera setting data 482b is data as to the arrangement position (three-dimensional position) and direction (angle formed by the respective axes of the camera coordinates system, or the three-dimensional coordinate of the center of interest) of the virtual camera, and comes in plurality kinds. This is because that even as to the same scene (animation), by changing the position of the virtual camera, and changing the direction of the virtual camera, a variety of game screens 120 can be made. Also, the game screen 120 has to be changed between when the own-team operated by the game player is offense (offensive turn) and when the team is defense (defensive turn). More specifically, as shown in FIG. 11 (A), setting A data (position a1, direction a2), setting B data (position b1, direction b2), and setting C data (position c1, direction c2), etc. are stored as the camera setting data 482b.

The animation data 482c is data to cause the object to make an arbitrary action, such as running, being knocked down, etc., and shows in time series the movement of each part of the object and the changes of the angle of each joint of the object. More specifically, as shown in FIG. 11 (B), for a running action, A data of the animation showing that the player runs with the ball in one hand, the B data of the animation showing that the player runs with the ball in the both hands, the C data of the animation showing that a slow player runs, etc. are stored as the animation data 482c. Also, for the action of being knock down, the A data of 1 animation showing that the player is knocked down by the tackle, the B data of 2 animation showing the player is knocked down by the tackle, the C data of animation showing that the player is grabbed and knocked down, etc are stored. Although illustration is omitted, animation data as to other actions, such as grabbing action, throwing of the tackler, etc. are stored.

The model data 482*d* is data with respect to the frame (bone and joint) of the object and the polygon of the object. By the bone and the polygon, a body height and a shape are changed. For example, as shown in FIG. 11(C), tall and smart player A data, tall and medium shape player B data, medium height and shape player C data, etc. are stored. Although illustration is omitted, data as to small object and fat object, etc. are also stored.

The formation data 482*e* is the coordinate data as to each object (position) in the formation (offensive formation and defensive formation) determined in advance for each team in the two-dimensional game world. For example, the offensive formation includes the I formation, the T formation, the wishbone formation, the shotgun formation, etc. Also, the defensive formation includes the 4-3 formation, the 4-4 formation, the 5-2 formation, the 3-4 formation, etc. More specifically, as shown in FIG. 12 (A), the formation data 482*e* is stored for each team, such as team A data, team B data, team C data, team D data, etc.

The route data 482*f* is data indicative of a two-dimensional moving route of the RB (two) and the QB (one) in each formation. For example, the two-dimensional coordinate of each frame is described in time series from the start of the offense. More specifically, as shown in FIG. 12(B), it is set for each formation such as, formation A data, formation B data, and formation C data, etc.

The table data 482*g* is table data for determining the number of encounterings and the number of DFs to be encountered in each encountering in the running plays. As described above, in the huddle mode, in a case that the game player on the offensive team selects the content of the play, and selects the running plays, the game player further selects a running route (right, middle, left) and a running RB. On the other hand, the game player on the defensive team makes an approximately similar operation to the game player on the offensive team to thereby predict the contents of the playing selected by the offensive team. More specifically, for the running plays, a running route (right, middle, left) is predicted, and a running RB is predicted. Also, for the passing plays, a ball throwing direction (right, middle, left) is predicted, and a ball-receiving receiver is predicted.

As shown in FIG. 12 (C), as to the table data 482*g*, the number of encounterings and the number of DFs in each encountering are described depending on the running route selected by the offensive team and the running route predicted by the defensive team. For example, if the running route selected by the offensive team is "left", and the running route predicted by the defensive team is "right", that is, if the prediction of the defensive team is opposite, the number of encounterings is "3", the number of DFs to be encountered is "1" at a first encountering, the number of DFs to be encountered is "2" at a second encountering, and the number of DFs to be encountered is "3" at a third encountering. Also, if the running route selected by the offensive team is "left", and the running route predicted by the defensive team is "left", that is, the prediction of the defensive team is accurate, the number of encounterings is "1", and the number of encounters is "3". In addition, if the running route selected by the offensive team is "middle", and the running route predicted by the defensive team is "right" or "left", that is, if the prediction by the defensive team is not opposite but missed, the number of encounterings is "2", the number of DFs to be encountered is "2" at a first encountering, and the number of DFs to be encountered is "3" at a second encountering.

That is, if the prediction by the defensive team is accurate, the number of encounterings is minimum value, if the prediction by the defensive team is opposite, the number of encounterings becomes a maximum value, and if the prediction by the defensive team is not opposite but missed, the number of encounterings becomes a middle value between the maximum value and the minimum value. This is because the gain of the offensive team is more increased if the prediction is missed. That is, in this embodiment, as described later, when the encountering is ended, the RB is knocked down by the DF, and therefore, as the number of encounterings is increased, an occasion of extending the running distance by the RB is increased. Accordingly, even if the number of encounterings is great, the RB may be knocked down by the DF to be encountered depending on the operation by the game player, and in such a case, it is impossible to earn the running distance, that is, the gain of the RB. Also, if the prediction of the running player is accurate, the number of encounterings is decreased by one. That is, the occasion of extending the running distance of the RB is decreased.

The player parameter 482*h* is data as to an ability value (speed, power, technique in this embodiment) of each player (object). For example, each of the speed, the power, and the technique is represented by a numerical value and the alphabet indicative of the level, and the data is stored as the player parameter 482*h*.

The encounter arrangement data 482*i* is the two-dimensional coordinate data for determining the arrangement position of each DF when the DF to be encountered is prepared as illustrated by means of FIG. 5. If the DF to be encountered is one, only the arrangement position is determined, and if the DF to be encountered is two or three, the DFs can make a formation by the two or three DFs as well as be placed side by side (horizontally). For example, if the DF to be encountered is two, the arrangement position of the respective DFs is dislocated to thereby make an obliquely arranged formation. Also, if the DF to be encountered is three, the arrangement position of the respective DFs is dislocated to thereby make an obliquely arranged formation, a mountain-shape formation, or a valley-shaped formation. The data is stored for each formation. More specifically, as shown in FIG. 13 (A), in the encounter arrangement data 482*i*, arrangement A data, arrangement B data, arrangement C data, arrangement D data, arrangement E data, arrangement F data, etc. are stored depending on the number of DFs to be encountered.

The mark displacement data 482*j* is data to indicate the displacement amount (difference) from the display position (midpoint of the DF) of the mark image 124 in a case that mark image 124 is displayed in a vibrating manner depending on the difference of the ability values of the RB and the DF. In this embodiment, since the mark image 124 is vibrated in the horizontal direction (X-axis direction) of the game screen 120, the displacement amount in the X axis direction is described for each frame. More specifically, as shown in FIG. 13 (B), a plurality kinds of the mark displacement data 482*j* are stored, such as displacement data A, displacement data B, displacement data C, displacement data D, displacement data E, displacement data F, displacement data G, . . . . This is because that different vibration-displays are to be performed depending on the difference in the ability values. For example, the greater the difference between the ability values is, the more the displacement amount is. On the contrary thereto, it may be possible that the greater the difference between the ability values is, the less the displacement amount is. Additionally, in the mark displacement data 482*j*, the number of frames after the encounter mode was set is shown, and the number of frames is counted by the after-encountering-elapsed-time counter 482q described later.

The object two-dimensional coordinate data 482k is coordinate data as to the current coordinate of each object in the two-dimensional game world. The coordinate data is updated for every frame. The object three-dimensional coordinate data 482m is data (coordinate data) as to the coordinate in the two-dimensional game world of each object calculated on the basis of the object two-dimensional coordinate data 482k. For example, the coordinate data of the three-dimensional coordinate is calculated where a specific animation (scrimmage state, touchdown, tackle, pass cut, intercept, etc.) is displayed and where an image for the mini game in the encounter mode is displayed.

The mark image two-dimensional coordinate data 482n is coordinate data of the two-dimensional coordinate of the mark image 124 calculated by projection-transforming the coordinate (three-dimensional coordinate) indicated by the mark image three-dimensional coordinate data 482p described later. The mark image three-dimensional coordinate data 482p is coordinate data of the three-dimensional coordinate of the mark image 124. As described above, the three-dimensional coordinate of the mark image 124 is calculated on the basis of the three-dimensional coordinate of the DF to be encountered. Also, as described above, the arrangement position of the DF to be encountered is updated for every frame, and therefore the three-dimensional position (three-dimensional coordinate) of the mark image 124 is also updated for every frame. Accordingly, the above-described mark image two-dimensional coordinate data 482n is also updated for every frame.

The after-encountering-elapsed-time counter 482q is reset and started after the encounter mode, and counts a lapse of time (the number of frames) from the start of the encountering.

Although illustration is omitted, the data storage area 482 stores data, such as game data (proceeding data and result data), sound data, image data, and provided with a flag and other counters.

Figure 14:
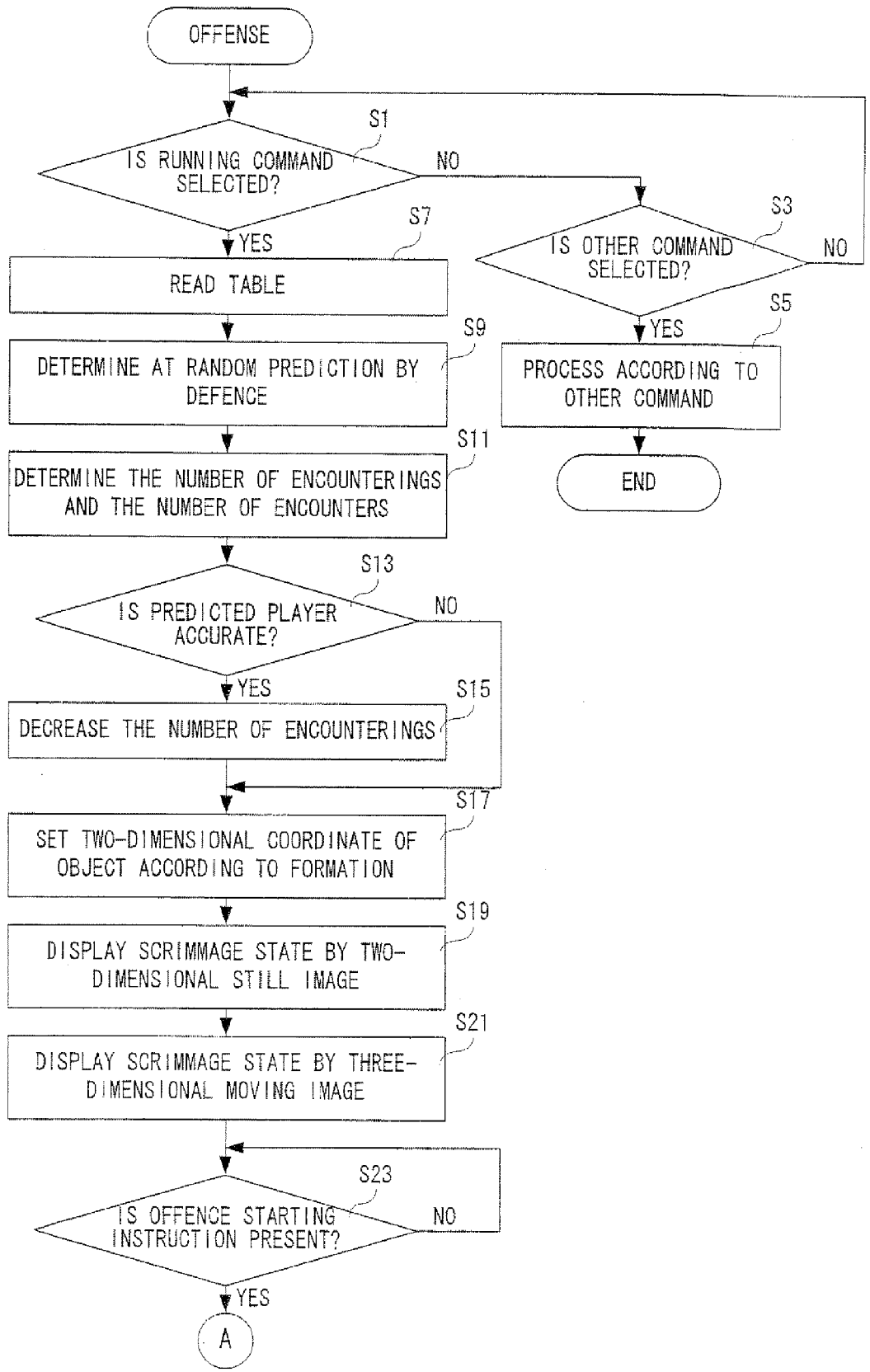
FIG. 14 is a flowchart showing a part of an offensive process of the CPU core 42 shown in FIG. 2.

More specifically, the CPU core 42 shown in FIG. 2 executes an offensive process according to a flowchart shown in FIG. 14-FIG. 20. It should be noted that for simplicity, a description is made on a case that the own-team operated by the game player is the offense, and the team operated by the computer (CPU core 42) is the defense. As shown in FIG. 14, when starting an offensive process, the CPU core 42 sets a huddle mode, and determines whether or not a running command is selected in a step S1. That is, it is determined whether or not the game player selects running plays. If "NO" in the step S1, that is, if the running command is not selected, it is determined whether or not another command is selected in a step S3. If "NO" in the step S3, it is determined that no command is selected, and the process returns to the step S1. However, if "YES" in the step S3, that is, if other command, such as passing and panting is selected, a process according to the other commands is executed in a step S5, and the offensive process is ended.

Also, if "YES" in the step S1, that is, if the running command is selected, the table data 482g is read in a step S7, and the prediction by the defense team is determined at random in a step S9. More specifically, the running RB and a running route are selected (determined) at random. That is, the defensive team predicts the offence by the offensive team.

In a succeeding step S11, the number of encounterings and the number of DFs to be encountered in each encountering are determined according to the table data 482g. In a succeeding step S13, it is determined whether or not the predicted player is accurate. That is, it is determined whether or not the RB predicted by the defensive team is equal to the RB selected by the offensive team. If "NO" in the step S13, that is, if the predicted player is missed, the process directly proceeds to a step S17. However, if "YES" in the step S13, that is, if the predicted player is accurate, the number of encounterings is subtracted in a step S15, and the process proceeds to the step S17.

In the step S17, the two-dimensional coordinate of the object is set according to the formation. That is, the set mode is set, according to the formation data 482e determined for each team, respective objects are arranged in the two-dimensional coordinate positions determined as to respective positions of the offensive team, and respective objects are arranged in the two-dimensional coordinate position determined as to respective positions of the defensive team. In a next step S19, a scrimmage state is displayed by a two-dimensional still image. That is, the game screen 100 is displayed on the LCD 12 as shown in FIG. 3. Succeedingly, in a step S21, the scrimmage state is displayed by a three-dimensional moving image. Here, the three-dimensional coordinate is calculated on the basis of the two-dimensional coordinate indicated by the object two-dimensional coordinate data 482k, and the object generated by utilizing the model data 482d, etc. is arranged (modeled) in the calculated three-dimensional coordinate. The above-described manner is shot by the virtual camera in the three-dimensional position and direction indicated by the selected camera setting data 482b, and displayed as the game screen 120 in the scrimmage state. Accordingly, it is possible to display the game screen 120 as shown in FIG. 3, for example.

In a succeeding step S23, it is determined whether or not an offence starting instruction is present. That is, it is determined whether or not the game player clicks the QB displayed on the game screen 120. If "NO" in the step S23, that is, if the offence starting instruction is absent, the process directly returns to the step S23 to wait for the presence of the offence starting instruction. However, if "YES" in the step S23, that is, if the offence starting instruction is present, the two-dimensional coordinate of the object is changed in a step S25 shown in FIG. 15. In this embodiment, after the offense is started from the scrimmage state, the two-dimensional coordinates of the RB and the QB on the offence are updated according to the route data 482f, and the two-dimensional coordinate is updated such that the guard (left guard (LG), right guard (RG)) and the center (C) on the offence, and the defensive line (left end (LE), right end (RE), defense tackle (DT)) on the defense are bumped with each other. It should be noted that since other objects are not displayed on the game screen 100, the two-dimensional coordinate is not updated, capable of reducing a processing load of the CPU core 42.

In a next step S27, the object is displayed in the tow-dimensional manner according to the updated two-dimensional coordinate. That is, the game screen 100 on which the face image of the objects corresponding to the updated two-dimensional position are pasted is displayed on the LCD 12. Also, in a step S29, an animation showing that the RB is running is displayed in a three-dimensional manner. That is, the CPU core 42 calculates the three-dimensional coordinate of the objects relating to the encountering on the basis of the two-dimensional coordinate updated in the step S25. Next, the respective objects are modeled in the calculated three-dimensional coordinate, and the respective objects are moved according to the animation data 482c. The position and the direction of the virtual camera are determined so as to shoot the RB. That is, the camera setting data 482b for shooting the RB from the front is selected. Accordingly, as shown in FIG. 4, an animation showing that the RB is running is displayed on the game screen 120. Additionally, although illustration is omitted, at this time, the arrow image 122 is displayed so as to be superposed on the animation of the RB. The same process is executed when an animation is displayed on the game screen 120 and so forth.

In a succeeding step S31, it is determined whether or not the RB exists in the range of the fixed distance A from the line of scrimmage. If "NO" in the step S31, that is, if the RB does not exist in the range of the fixed distance A from the line of scrimmage, the process directly returns to the step S25. However, if "YES" in the step S31, that is, if the RB exists in the range of the fixed distance A from the line of scrimmage, the DF is selected from the LB, the DB, the CB, the S by the number determined on the basis of the table data 482g in a step S33. However, the DF which has already (previously) been run through by the RB cannot be selected. Furthermore, the DF to be encountered is selected according to the priorities determined in advance or at random.

Succeedingly, in a step S35, one of the encounter arrangement data 482i is selected on the basis of the number of DFs determined on the basis of the table data 482g. For example, if the number of encounters is "2" or "3", a piece of arrangement data is selected from the plurality of arrangement data at random. Then, in a step S37, the two-dimensional coordinate of the selected player (object) is rearranged on the basis of the encounter arrangement data 482i selected in the step S35 by taking the reference coordinate (X-coordinate of the RB, Y-coordinate-α of upper end of the display area) as a reference. Noted that α is set as two to three dots. If the three DFs are arranged, the DF located at the center is arranged in the reference coordinate, and the other two DFs are arranged on the basis of the encounter arrangement data 482i by taking the DF at the middle as a center. Then, depending on the DF to be encountered, a formation is made.

Figure 16:
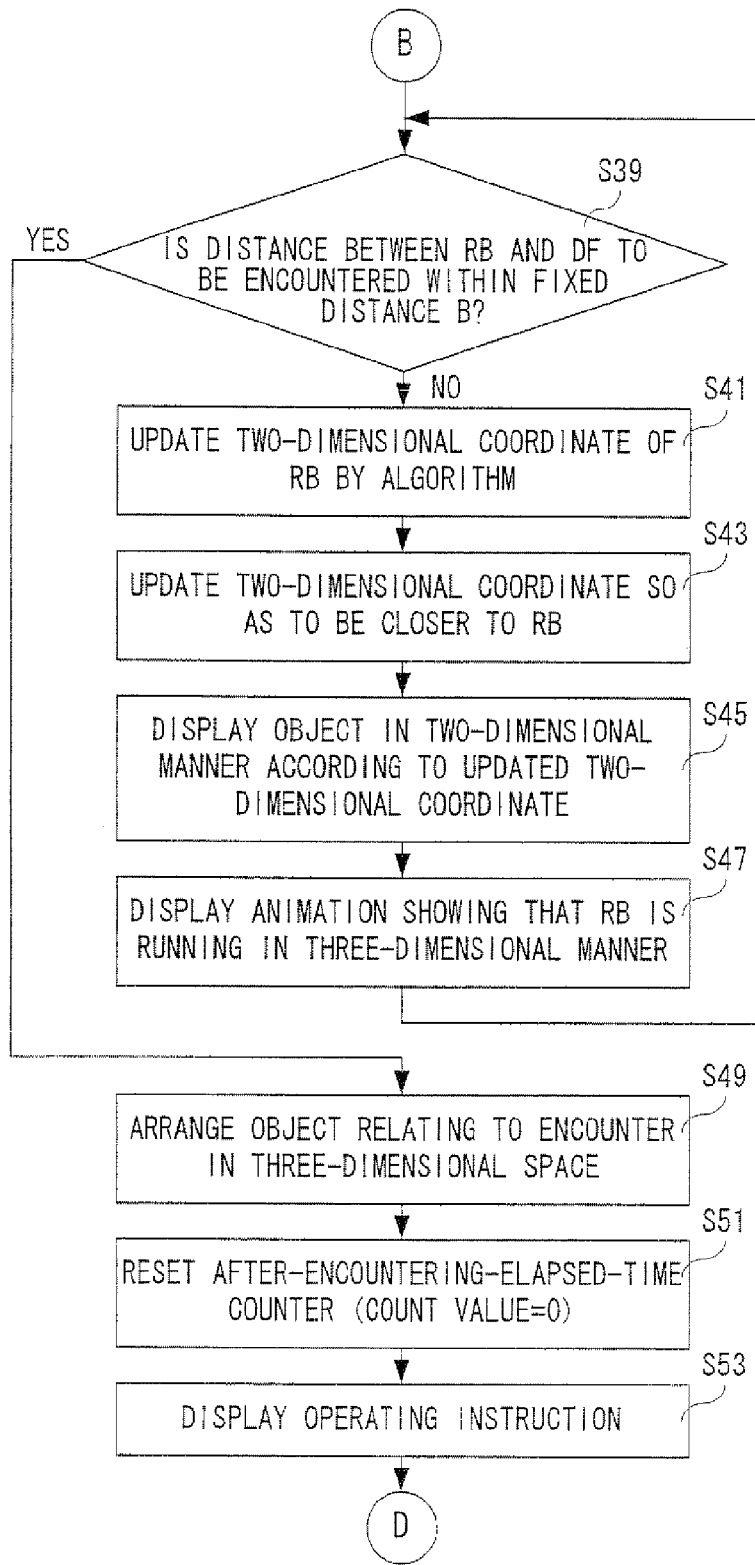
FIG. 16 is a flowchart showing the other part of the offensive process of the CPU core 42 shown in FIG. 2, and continued from FIG. 14 and FIG. 15.

As shown in FIG. 16, in a next step S39, it is determined whether or not the distance between the RB and the DF to be encountered is within the fixed distance B. Additionally, if a plurality of DFs to be encountered exist, it is determined whether or not a distance between the RB and each DF is within the fixed distance B. If "NO" in the step S39, that is, if the distance between the RB and the DF to be encountered is not within the fixed distance B, the RB is moved according to the predetermined algorithm (for purposes of explanation, referred to as "algorithm A"). As described above, the position of the RB (two-dimensional coordinate) is updated according to the route data 48f. However, after the position of the RB is updated to a certain extent, it is updated according to the algorithm A. For example, the algorithm A is an arithmetic process for subtracting the Y-coordinate of the two-dimensional coordinate indicative of the position of the RB by tow to three dots. Accordingly, the two-dimensional coordinate where the RB is arranged is updated such that the RB moves directly upward on the game screen 100. It should be noted that it is not limited thereto, by changing both of the X-coordinate and Y-coordinate of the two-dimensional coordinate indicative of the position of the RB, it is possible to move the RB obliquely upwardly.

In a succeeding step S43, the DF to be encountered moves so as to be closer to the RB. More specifically, at least one of the components of the two-dimensional coordinate where the DF is arranged is updated so as to be closer to the two-dimensional coordinate where the RB which has been updated in the step S41 is arranged. Next, in a step S45, the objects relating to encountering are displayed in a two-dimensional manner according to the updated two-dimensional coordinate. That is, as shown in FIG. 4 or FIG. 5, the updated game screen 100 is displayed on the LCD 12. Then, in a step S47, an animation showing that the RB is running is displayed in a three-dimensional manner, that is, the updated game screen 120 is displayed on the LCD 14, and the process returns to the step S39.

Figure 6:
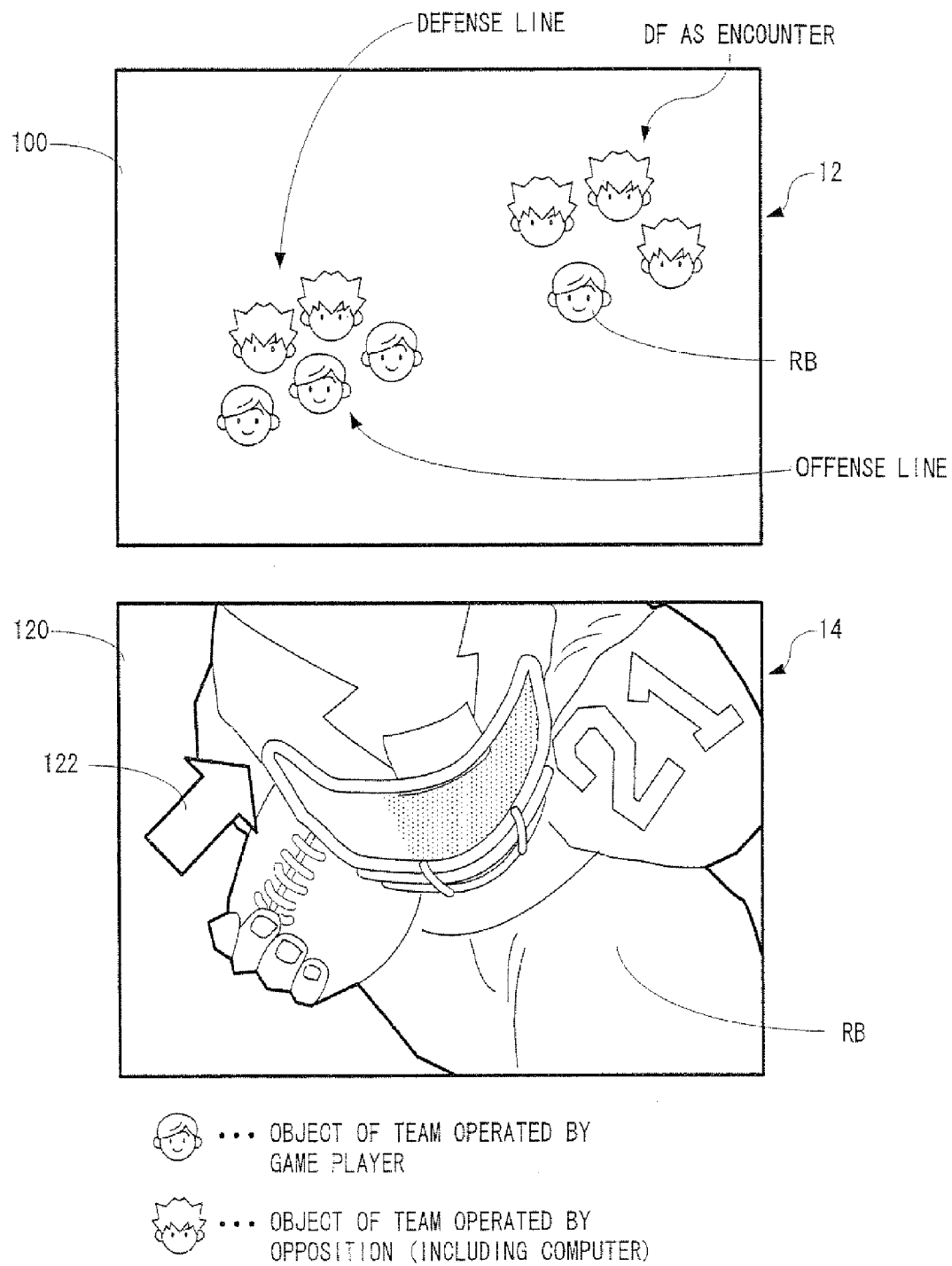
FIG. 6 is an illustrative view showing another example of the game screen to be displayed on each LCD provided on the game apparatus shown in FIG. 1.

If "YES" in the step S39, that is, if the distance between the RB and the DF to be encountered is within the fixed distance B, the DF to be encountered is arranged in the three-dimensional space in a step S49. Here, the three-dimensional coordinate of the objects relating to the encountering are calculated on the basis of the two-dimensional coordinates of the applied objects, and the respective objects are modeled in the calculated three-dimensional coordinate. Then, a running action is executed according to the animation data 482c. In a succeeding step S51, the after-encountering-elapsed-time counter 482q is reset (count value=0), and in a step S53, an operating instruction is displayed. That is, as shown in FIG. 6, a game screen 100 for the explanation as to manner of operation is displayed on the LCD 12.

Figure 17:
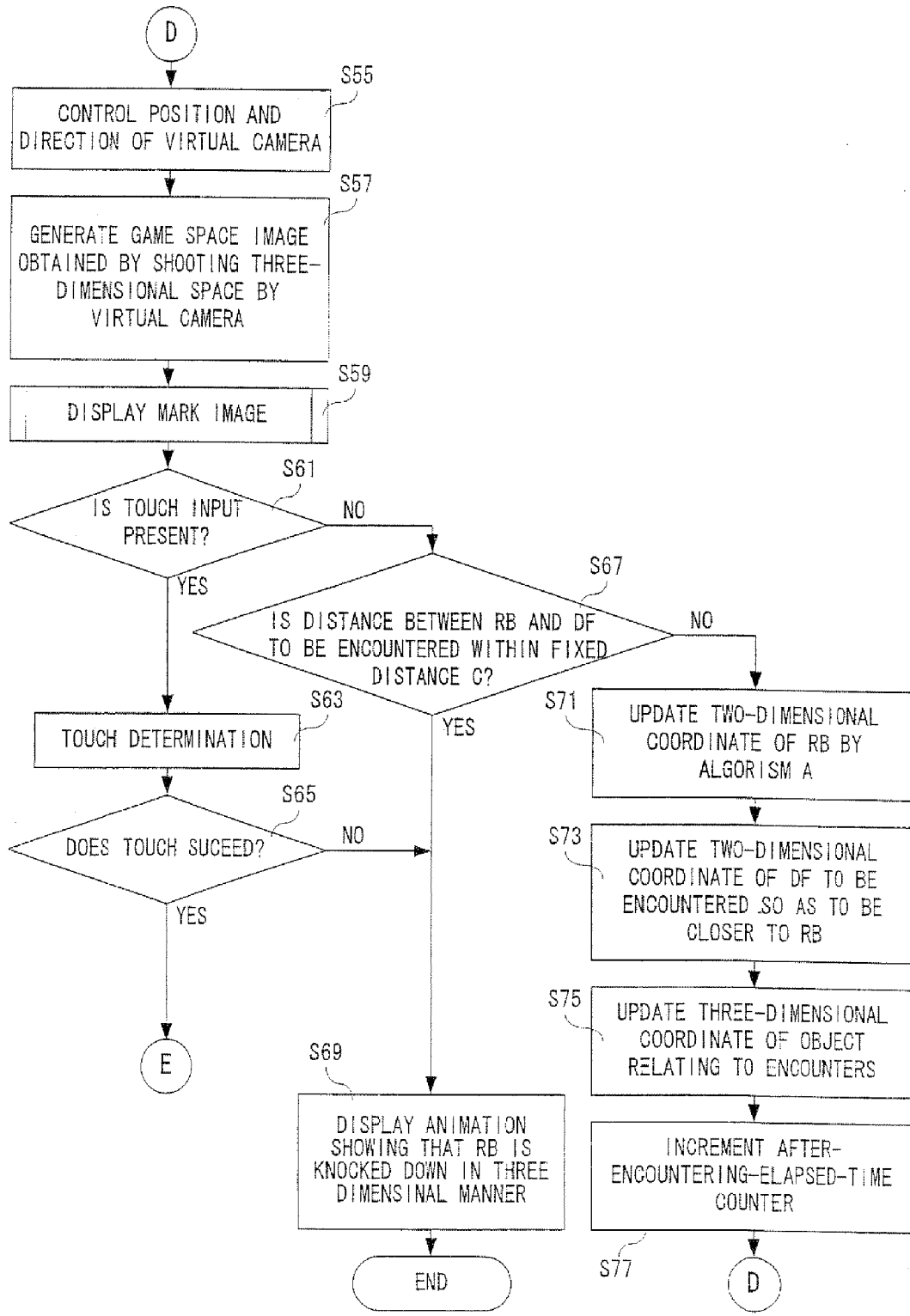
FIG. 17 is a flowchart showing a further part of the offensive process of the CPU core 42 shown in FIG. 2, and continued from FIG. 16.

Succeedingly, in a step S55 shown in FIG. 17, the position and the direction of the virtual camera are controlled. Here, the arrangement position of the virtual camera is determined in a position of the head of the QB modeled in the step S49, and the direction of the virtual camera is determined along the line of sight of the QB. The direction of the line of sight, that is, the direction of the virtual camera is, where a DF to be encountered is one, determined to be a direction of the DF. Where the DF to be encountered is two, the direction of the virtual camera is determined to be the distance (center) between the two DFs. Additionally, if the DF to be encountered is three, the direction of the virtual camera is determined to be the DF at the center. Generally speaking, in a case that the DF to be encountered is one (1), the direction of the virtual camera is directed to the DF, and in a case that the DF to be encountered is tow or more, if the number of DFs is an odd number (2), the direction of the virtual camera is determined to be the DF at the center, and if the number of DFs is an even number (3), the direction of the virtual camera is determined to be the space between the DFs at the center.

Then, in a step S57, a game space image obtained by shooting the three-dimensional space with the virtual camera is generated. That is, the movie (image) shot by the virtual camera is projection-transformed to generate a two-dimensional image. In a next step S59, a mark image displaying process (see FIG. 20) described later is executed. Accordingly, an animation showing that the DF to be encountered is closer to the RB, and the mark image 124 is displayed between the DFs to be encountered is displayed on the game screen 120 of the LCD 14.

In a succeeding step S61, it is determined whether or not a touch input is present. Here, the CPU core 42 determines whether or not the coordinate data input from the touch panel 22 is stored with reference to the buffer (not illustrated) provided in the I/F circuit 54. If the coordinate data is stored, it is determined that a touch input is present, and "YES" is determined in the step S61. Then, in a step S63, a touch determining process is executed. Although illustration is omitted, when detecting the coordinate data, the CPU core 42 stores the detected coordinate data in the RAM 48 for a touch determining process. In the touch determining process in the step S63, the coordinate (hereinafter referred to as "touch coordinate") corresponding to the coordinate data indicates the mark image 124. If the touch coordinate indicates the mark image 124, the distance from the center of the mark image 124 to the touch coordinate is detected, that is, accuracy of the touch is determined.

Then, it is determined whether or not a touching succeeds in a step S65. Here, it is determined whether or not the touch coordinate is the center or in the vicinity of the mark image 124. If "YES" in the step S65, that is, if the touching succeeds, the process proceeds to a step S79 shown in FIG. 18. However, if "NO" in the step S65, that is, if the touching fails, an animation showing that the RB is knocked down due to being tackled, and so forth by the defense to be encountered is displayed in a three-dimensional manner, that is, the game screen 120 in which the RB is knocked down is displayed on the LCD 14 in a step S69, and the offensive process is ended.

If "NO" in the step S61, that is, if the coordinate data is not stored in the buffer, it is determined that a touch input is absent, and it is determined whether or not the distance between the RB and the DF to be encountered is within a fixed distance C (<fixed distance B) in a step S67. More specifically, it is determined whether or not the DF to be encountered is closed to the RB in such a distance as to grab the RB, and tackle the RB.

If "YES" in the step S67, that is, if the distance between the RB and the DF to be encountered is within the fixed distance C, the process proceeds to the step S69. On the other hand, if "NO" in the step S67, that is, if the distance between the RB and the DF to be encountered is not within the fixed distance C, the two-dimensional coordinate of the RB is updated according to the algorithm A in a step S71, the two-dimensional coordinate of the DF to be encountered is updated so as to be closer to the RB in a step S73, and the three-dimensional coordinates of the objects relating to the encountering, that is, the RB and the DF to be encountered are updated in a step S75. Then, in a step S77, the after-encountering-elapsed-time counter 482q is incremented, and the process returns to the step S55.

Figure 18:
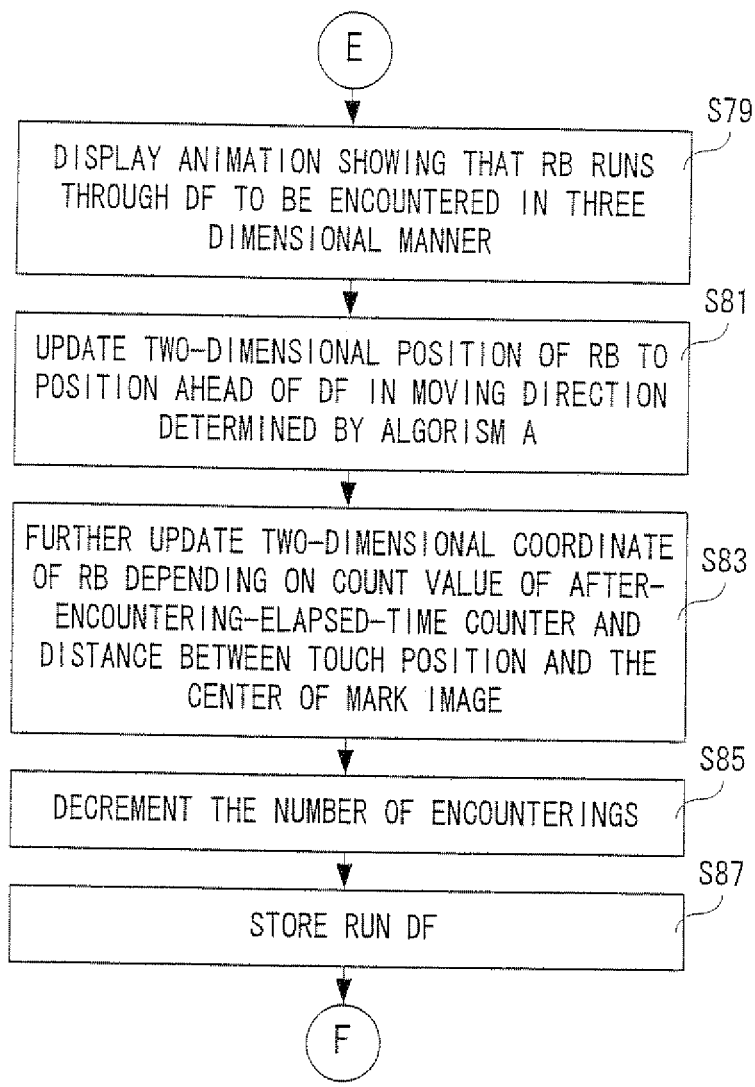
FIG. 18 is a flowchart showing another part of the offensive process of the CPU core 42 shown in FIG. 2, and continued from FIG. 17.

As described above, if the touching the mark image 124 succeeds, and if "YES" is determined in the step S65, an animation showing that the RB runs through the DF to be encountered is displayed in the three-dimensional manner in the step S79 as shown in FIG. 18. That is, an animation showing that the RB runs through the DF to be encountered is displayed on the game screen 120 of the LCD 14. In a succeeding step S81, the two-dimensional coordinate of the RB is updated to the position ahead of the DF in the moving direction determined by the algorithm A. In a next step S83, the two-dimensional coordinate of the RB is further updated depending on the count value of the after-encountering-elapsed-time counter 482q, and the distance between the touch position and the center of the mark image 124. That is, as the mark image 124 is touched in a brief time, and the touch position is accurate, the two-dimensional coordinate of the RB is updated to the running direction (upward direction of the game screen 100), allowing the RB to earn a gain.

Figure 19:
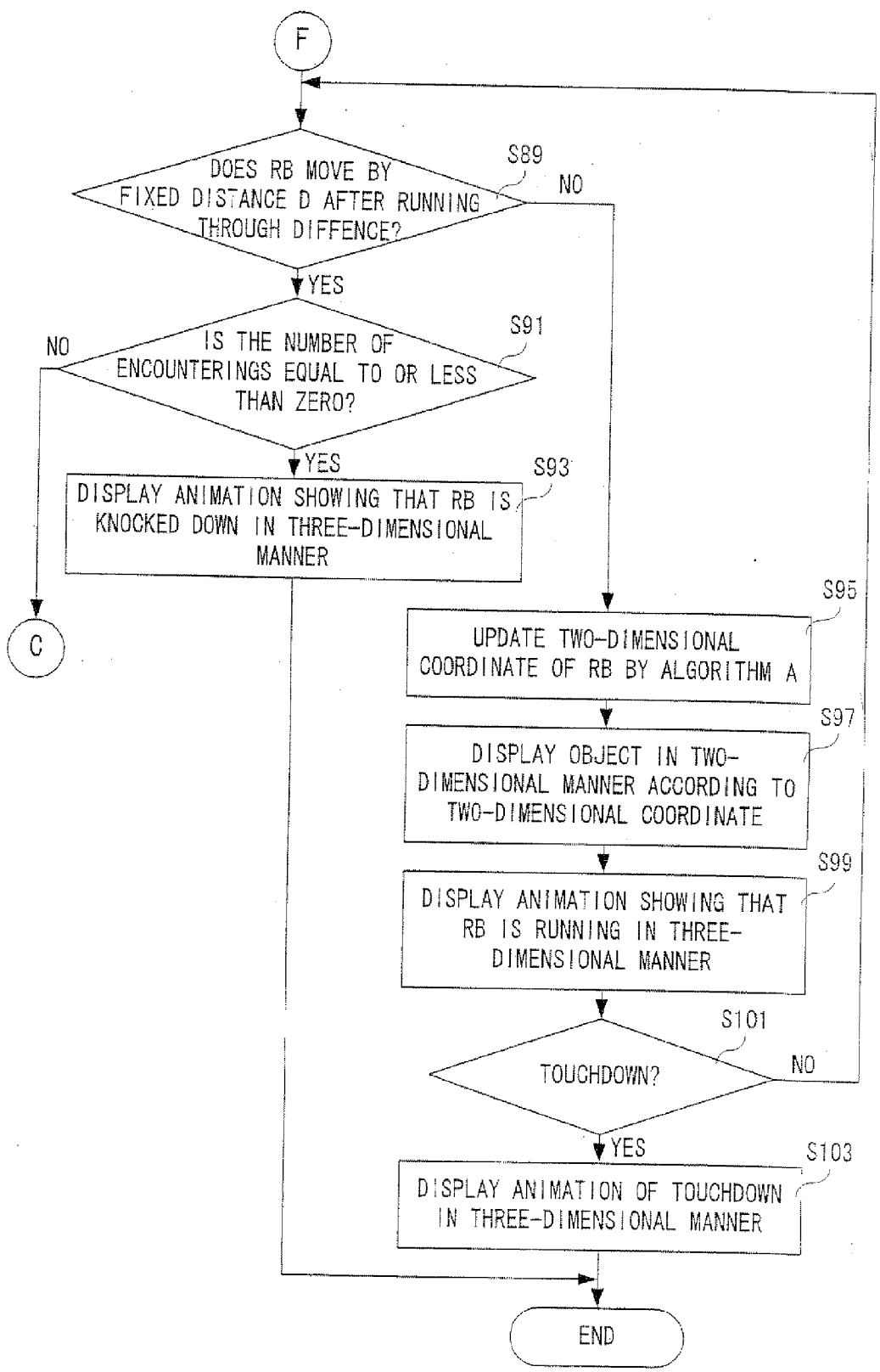
FIG. 19 is a flowchart showing the other part of the offensive process of the CPU core 42 shown in FIG. 2, and continued from FIG. 18.

Then, in a step S85, the number of encounterings is decremented, and in a step S87, the DF which was run through is stored, and the process proceeds to a step S89 shown in FIG. 19. However, if touching the mark image 124 displayed between the two DFs succeeds in the step S87, the two DFs are run through, and the 2 DFs are stored in such a case.

As shown in FIG. 19, in the step S89, it is determined whether or not the RB moves by a fixed distance D after the RB runs through DF. The fixed distance D is a distance for determining whether or not the next DF to be encountered is prepared, and is set to become longer than the fixed distance B and the fixed distance C. For example, the fixed distance D is set to be the same or approximately the same as the fixed distance A. If "YES" in the step S89, that is, if the RB moves by the fixed distance D after running through the DF, it is determined whether or not the number of encounterings is equal to or less than zero in a step S91.

Figure 15:
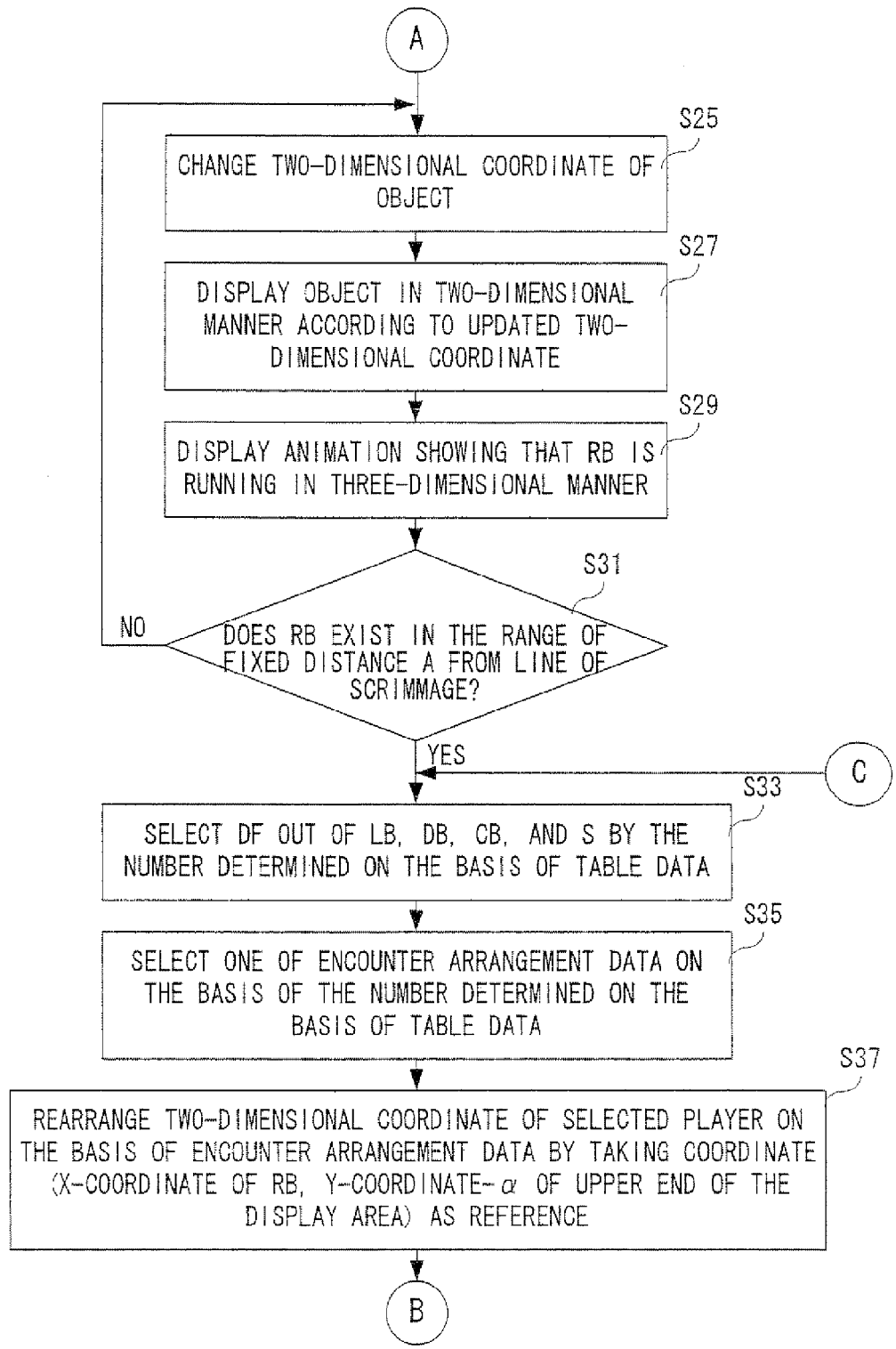
FIG. 15 is a flowchart showing another part of the offensive process of the CPU core 42 shown in FIG. 2, and continued from FIG. 14.

If "NO" in the step S91, that is, if the number of encounterings is equal to or more than one, the process returns to the step S33 shown in FIG. 15. That is, a preparation for next encountering is made. On the other hand, if "YES" in the step S91, that is, if the number of encounterings is equal to or less than zero, an animation showing that the RB is knocked down is displayed in the three-dimensional manner in a step S93, and the offensive process is ended. That is, in the step S93, the animation where the RB is knocked down by being tackled and caught by the DF, etc. is displayed on the game screen 120 of the LCD 14.

Also, if "NO" in the step S89, that is, if the RB does not move by the fixed distance D after running through the DF, the two-dimensional coordinate of the RB is updated according to the algorithm A in a step S95. In a next step S97, the object is displayed in a two-dimensional manner according to the two-dimensional coordinate. That is, a game screen 100 in which the face images of the objects of the offensive line and the defensive line and the face images of the RB are pasted on the respective two-dimensional coordinate is displayed on the LCD 12. Also, in a step S99, an animation showing that the RB is running is displayed in a three-dimensional manner. That is, a game screen 120 showing that the RB is running is displayed on the LCD 14.

Then, in a step S101, it is determined whether or not a touchdown is made. More specifically, it is determined whether or not the Y-coordinate of the two-dimensional coordinate of the RB with the ball is smaller than the Y-coordinate of the opponent's end line. If "NO" in the step S101, that is, if the touchdown is not made, the process directly returns to the S89. However, if "YES" in the step S101, that is, if the touchdown is made, the animation of the touchdown is displayed in a three-dimensional manner in a step S103, and the offensive process is then ended. That is, a game screen 120 showing that the RB with the ball runs into the end zone is displayed. Additionally, after the game screen 120 in which the RB makes a touchdown is displayed, the game screen 120 in which the RB slams the ball against the ground (field), and the RB and other players (objects) on the offensive team dance for joy may be displayed.

Figure 20:
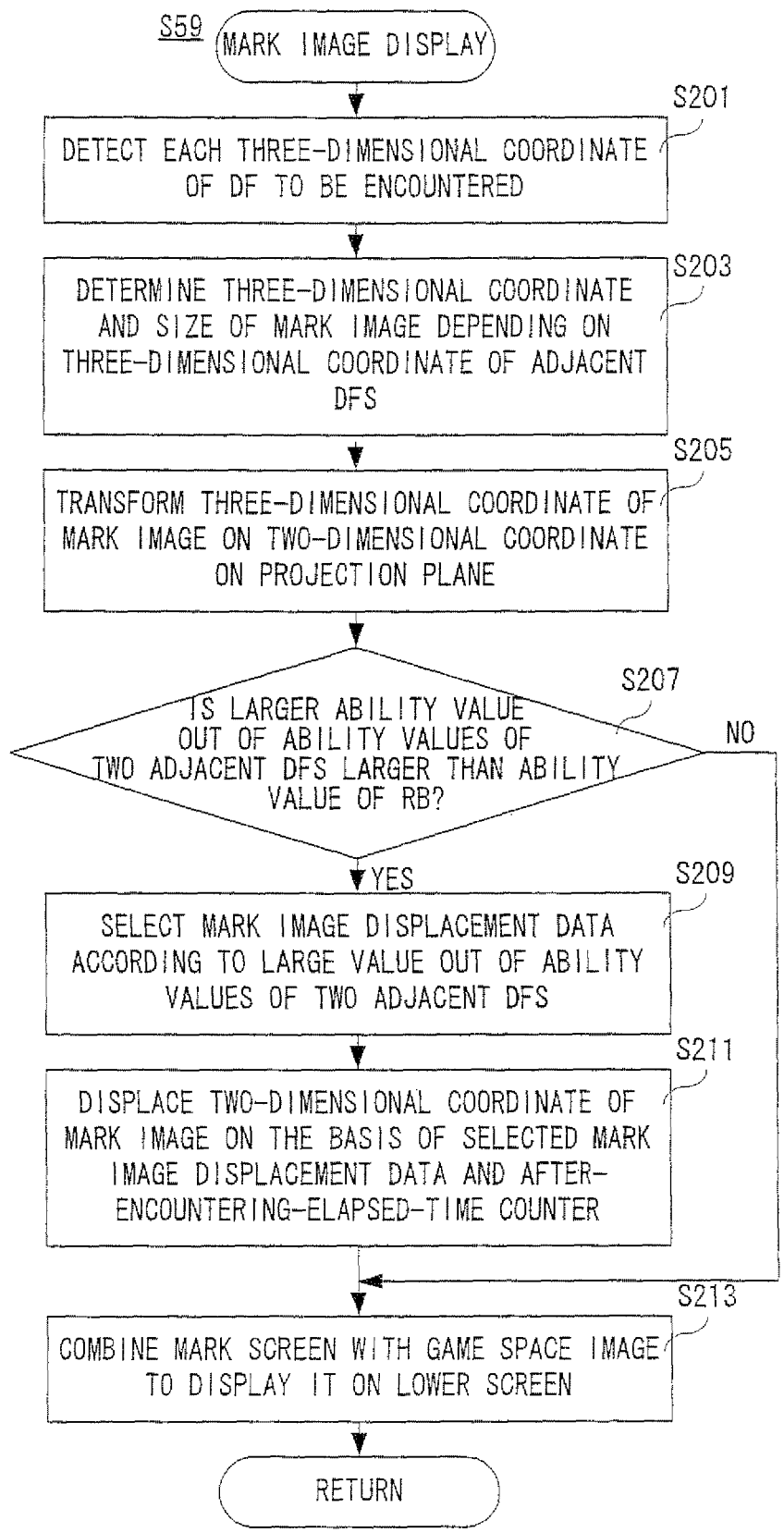
FIG. 20 is a flowchart showing a mark displaying process of the CPU core shown in FIG. 2.

FIG. 20 is a flowchart showing a mark image displaying process in the step S59 shown in FIG. 17. With reference to FIG. 20, when starting the mark image displaying process, the CPU core 42 detects each three-dimensional coordinate of the DF to be encountered in a step S201. Here, each of the three-dimensional coordinate of the DF to be encountered is obtained from the three-dimensional coordinate calculated in the step S49. In a succeeding step S203, depending on the three-dimensional coordinate of the adjacent DFs, the three-dimensional coordinate and the size of the mark image 124 are determined (calculated). The determination (calculation) method is as described. In a succeeding step S205, the three-dimensional coordinate of the mark image 124 is transformed into the two-dimensional coordinate on a projection plane. More specifically, by utilizing a determinant of matrix of the projection transformation, the two-dimensional coordinate is obtained from the three-dimensional coordinate of the mark image 124, and the image (two-dimensional image) of the mark image 124 is pasted in the size determined in the step S203 in the obtained two-dimensional coordinate. That is, the two-dimensional mark screen is generated.

In a succeeding step S207, it is determined whether or not a larger ability value out of the ability values of the two adjacent DFs is larger than the ability value of the RB. Here, the comparison of the ability values is performed as to respective parameters between the two adjacent DFs or between the RB and the DF, and one of them who have a lot of parameters with a larger numerical value is determined to be one who has a high ability value. It should be noted that the total values of the numerical values of the respective parameters are compared with the two adjacent DFs, or compared between the RB and the DF. If "NO" in the step S207, that is, if a larger ability value out of the ability values of the two adjacent DFs is less than the ability value of the RB, the process directly proceeds to a step S213.

However, if "YES" in the step S207, that is, if a larger ability value out of the ability values of the two adjacent DFs is larger than the ability value of the RB, the mark displacement data 482j is selected depending on a larger value out of the ability values of the two adjacent DFs in a step S209. In a next step S211, the two-dimensional coordinate of the mark image 124 is displaced on the basis of the selected mark displacement data 482j and the count value of the after-enouncing-elapsed-time counter 482q, and then the process proceeds to the step S213. That is, with reference to the mark displacement data 482j, a displacement amount of the frame indicated by the count value of the after-enouncing-elapsed-time counter 482q is obtained, and the obtained displacement amount is added to the current two-dimensional coordinate of the mark image 124.

Although illustration is omitted, the process in the steps S207 to S211 is executed as to each of the mark image 124.

Then, in the step S213, a game screen 120 in which the two-dimensional mark screen is combined with the game space image, that is, the three-dimensional image of the animation showing that the DF to be encountered is closer to the RB, is displayed on the LCD 14. Then, the mark image displaying process is returned.

Additionally, the mark image displaying process is executed per unit of time (one frame), and therefore, the display position and the size of the mark image 124 are also updated for every frame.

According to this embodiment, the two-dimensional coordinate of the object is updated, the three-dimensional coordinate is calculated from the two-dimensional coordinate as necessary, and whereby, the three-dimensional game screen is displayed. Thus, it is possible to display an appropriate game screen in correspondence with the progress of the game.

In this embodiment, when the encounter mode is started, merely touching the mark image, the game player can cause the RB to run through the DF, the RB to be knocked down by the DF, and thus can enjoy playing the game with a simple operation.

In addition, in this embodiment, the display position and the size of the mark image are determined according to the three-dimensional coordinates of the plurality of DFs, and depending on the right or wrong of instructing the mark image, the development of the game is changed, and therefore, it is possible to lead the game player to instruct the coordinates position in correspondence with the progress of the game.

Furthermore, in this embodiment, although the game screen 100 of the two-dimensional image is displayed on the LCD 12, the game screen 100 of an overhead image and a game screen 100 of a three-dimensional coordinate may be displayed without being limited thereto. In such a case, it is determined whether or not the process is shifted to the encounter mode on the basis of the three-dimensional coordinate of the object.

Additionally, in this embodiment, although it is determined whether or not the animation of the three-dimensional image is displayed depending on the two-dimensional position of the object, it is not limited thereto. For example, if the object makes a predetermined action, the animation of the three-dimensional image is displayed.

Also, in this embodiment, although the touch panel is utilized as a pointing device, other pointing devices, such as a computer mouse, a touch pad, a tablet may be useable. In such a case, an instruction image, such as a mouse pointer and a cursor is displayed on the game screen 120, and the instruction image has to be operated by means of the computer mouse, etc.

In addition, in this embodiment, a description is made on a case that two LCDs are provided and two game screens are displayed. However, one LCD is provided, and a touch panel is set on it to display one game screen on the LCD.

Also, in this embodiment, a description is made on the game apparatus with the two LCDs. However, the display area of one LCD is divided into two, and on at least one of the display areas, the touch panel may be set. In this case, for a vertically-long LCD, the display area of the LCD is divided so as to be vertically arranged with each other, and for a horizontally-long LCD, the display area of the LCD is divided so as to be horizontally arranged with each other.

Although example embodiments of the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus, comprising:
  a processor;
  at least one input device coupled to said processor;
  a memory coupled to said processor, said memory storing instructions that, when executed by said processor, control said processor to:
  generate a game image including at least an object image on the basis of a three-dimensional coordinate of the object in the virtual game world;
  calculate a two-dimensional coordinate to combine a mark image with said game image on the basis of the three-dimensional coordinate of said object, the mark image being different from said object image;
  combine said mark image with said generated game image in the calculated two-dimensional coordinate;
  detect an operation input from a player; and
  perform different game processes depending on whether or not the position indicated by the detected operation input is on said mark image.

2. The game apparatus of claim 1, wherein the object is a non-player object and the calculated two-dimensional coordinate is a two-dimensional coordinate of the mark image so that the mark image is combined with said game image on the basis of the three-dimensional coordinate of said non-player object.

3. The game apparatus of claim 2, wherein the non-player object is an opponent object.

4. The game apparatus of claim 1, wherein:
  the object is one of a plurality of objects in the virtual game world; and
  the two-dimensional coordinate of the mark image and a size of the mark image are calculated, to combine the mark image with said game image, on the basis of the three-dimensional coordinates of said plurality of objects.

5. A game apparatus, comprising:
a processor;
at least one input and display device coupled to said processor;
a memory coupled to said processor, said memory storing instructions that, when executed by said processor, control said processor to:
generate a game image including at least an object image by shooting a virtual game world with a virtual camera, and displaying it on said display;
calculate a new three-dimensional coordinate by performing a predetermined arithmetic process on the basis of the three-dimensional coordinate of said object in said virtual game world;
transform said new calculated three-dimensional coordinate to a screen coordinate;
set a region on said display portion taking the transformed screen coordinate as a reference;
combine a mark image corresponding to the set region with said game image, and display it on said display, the mark image being different from said object image;
receive a player input coordinate on said display; and
perform a predetermined game process by comparing the input coordinate and the set region.

6. A game apparatus, comprising:
a processor;
at least one input and display device coupled to said processor;
a memory coupled to said processor, said memory storing instructions that, when executed by said processor, control said processor to:
generate a game image to be displayed on the display by shooting a virtual game world with a virtual camera;
determine a coordinate on said display on the basis of three-dimensional coordinates of a plurality of objects in said virtual game world;
set a region on said display portion by taking the determined coordinate as a reference;
combine a mark image corresponding to the set region with said game image, and display it on said display, the mark image being different from images of said plurality of objects;
receive a player input coordinate on said display; and
perform a predetermined game processing by comparing the input coordinate and the set region.

7. A non-transitory storage medium storing a game program, said game program causes a processor of a game apparatus to perform:
generating a game image including at least an object image on the basis of a three-dimensional coordinate of the object in a virtual game world;
calculating a two-dimensional coordinate to combine a mark image with said game image on the basis of the three-dimensional coordinate of said object;
combining said mark image with said generated game image in the calculated two-dimensional coordinate, the mark image being different from said object image;
detecting an operation input from a player; and
performing different game processes depending on whether or not the position indicated by the detected operation input is on said mark image.

8. The non-transitory storage medium of claim 7, wherein the object is a non-player object and the calculated two-dimensional coordinate is a two-dimensional coordinate of the mark image so that the mark image is combined with said game image on the basis of the three-dimensional coordinate of said non-player object.

9. The non-transitory storage medium of claim 8, wherein the non-player object is an opponent object.

10. The non-transitory storage medium of claim 7, wherein:
the object is one of a plurality of objects in the virtual game world; and
the two-dimensional coordinate of the mark image and a size of the mark image are calculated, to combine the mark image with said game image, on the basis of the three-dimensional coordinates of said plurality of objects.

11. A non-transitory storage medium storing a game program, said game program causes a processor of a game apparatus to perform:
generating a game image including at least an object image by shooting a virtual game world with a virtual camera, and displaying it on a display portion;
calculating a new three-dimensional coordinate by performing a predetermined arithmetic process on the basis of the three-dimensional coordinate of said object in said virtual game world;
transforming said new calculated three-dimensional coordinate to a screen coordinate;
setting a region on said display portion taking the transformed screen coordinate as a reference;
combining a mark image corresponding to the set region with said game image, and displaying it on said display portion, the mark image being different from said object image;
receiving a player input coordinate on said display portion; and
performing a predetermined game process by comparing the input coordinate and the set region.

12. A non-transitory storage medium storing a game program, said game program causes a processor of a game apparatus to perform:
generating a game image to be displayed on a display portion by shooting a virtual game world with a virtual camera;
determining a coordinate on said display portion on the basis of three-dimensional coordinates of a plurality of objects in said virtual game world;
setting a region on said display portion by taking the determined coordinate as a reference;
combining a mark image corresponding to the set region with said game image, and displaying it on said display portion, the mark image being different from images of said plurality of objects;
receiving a player input coordinate on said display portion; and
performing a predetermined game processing by comparing the input coordinate and the set region.

13. A game controlling method performed by a computer system, comprising:
(a) generating a game image including at least an object image on the basis of a three-dimensional coordinate of the object in a virtual game world,
(b) calculating a two-dimensional coordinate to combine a mark image with said game image on the basis of the three-dimensional coordinate of said object,
(c) combining said mark image with said game image generated by (a) in the two-dimensional coordinate calculated by (b), the mark image being different from said object image,
(d) detecting an operation input from a player, and (e) performing different game processes depending on whether or not the position indicated by the operation input detected by at least (d) is on said mark image.

14. The method of claim 13, wherein the object is a non-player object and the calculated two-dimensional coordinate is a two-dimensional coordinate of the mark image so that the mark image is combined with said game image on the basis of the three-dimensional coordinate of said non-player object.

15. The method of claim 14, wherein the non-player object is an opponent object.

16. A game controlling method performed by a computer system, comprising:
(a) generating a game image including at least an object image by shooting a virtual game world with a virtual camera, and displaying it on a display portion,
(b) calculating a new three-dimensional coordinate by performing a predetermined arithmetic process on the basis of the three-dimensional coordinate of said object in said virtual game world,
(c) transforming said new three-dimensional coordinate calculated by (b) to a screen coordinate,
(d) setting a region on said display by taking the screen coordinate transformed by (c) as a reference,
(e) combining a mark image corresponding to the region set by (d) with said game image, and displaying it on said display portion, the mark image being different from said object image,
(f) receiving a player input coordinate on said display portion, and
(g) performing a predetermined game process by comparing the coordinate input by (f) and the region set by (d).

17. A game controlling method performed by a computer system, comprising:
(a) generating a game image to be displayed on a display portion by shooting a virtual game world with a virtual camera,
(b) determining a coordinate on said display portion on the basis of three-dimensional coordinates of a plurality of objects in said virtual game world,
(c) setting a region on said display by taking the coordinate determined by said step (b) as a reference,
(d) combining a mark image corresponding to the region set by (c) with said game image, and displaying it on said display portion, the mark image being different from images of said plurality of objects,
(e) receiving a player input coordinate on said display, and
(f) performing a predetermined game processing by comparing the coordinate input by (e) and the region set by (c).

18. The method of claim 13, wherein:
the object is one of a plurality of objects in the virtual game world; and
the two-dimensional coordinate of the mark image and a size of the mark image are calculated, to combine the mark image with said game image, on the basis of the three-dimensional coordinates of said plurality of objects.

* * * * *